(12) United States Patent
Sheppard et al.

(10) Patent No.: US 7,765,026 B2
(45) Date of Patent: Jul. 27, 2010

(54) MULTIPLE SERVICE VENDING MACHINE WITH UNITIZED PRICING AND PROPORTIONALIZED ANALOG DISPLAY

(75) Inventors: Clinton E. Sheppard, Mountain Home, AR (US); James Larry Ingram, Hot Springs, AR (US); Yefim Y. Fundyler, Little Rock, AR (US); Tony M. Goodwin, White Hall, AR (US)

(73) Assignee: Fragramatics Manufacturing Company, Inc., Pine Bluff, AR (US)

( * ) Notice: Subject to any disclaimer, the term of this patent is extended or adjusted under 35 U.S.C. 154(b) by 961 days.

(21) Appl. No.: 11/385,596

(22) Filed: Mar. 21, 2006

(65) Prior Publication Data

US 2007/0225860 A1    Sep. 27, 2007

(51) Int. Cl.
*G06F 17/00* (2006.01)
(52) U.S. Cl. .............. 700/236; 700/232; 700/244; 221/2; 221/7; 221/8
(58) Field of Classification Search ......... 700/231–244; 221/2, 7, 8
See application file for complete search history.

(56) References Cited

U.S. PATENT DOCUMENTS

| | | | |
|---|---|---|---|
| 1,554,161 A | 9/1925 | Hubard | |
| 1,693,526 A | 11/1928 | Owens | |
| 2,142,558 A | 1/1939 | Dumelin | |
| 3,561,395 A | 2/1971 | Piersma | |
| 3,852,737 A | 12/1974 | Gordon | |
| 4,117,465 A | 9/1978 | Timblin | |
| 4,382,312 A | 5/1983 | Liggett | |
| 4,527,713 A | 7/1985 | Ingram | |
| 4,876,532 A | 10/1989 | Sauls | |
| 5,290,077 A | 3/1994 | Fleming | |
| 5,371,681 A * | 12/1994 | Juds et al. | 700/237 |
| 5,373,716 A | 12/1994 | MacNeil | |
| 5,881,789 A | 3/1999 | Malashenko | |
| 5,884,807 A | 3/1999 | Yun | |
| 6,243,920 B1 | 6/2001 | Sauve | |
| 6,402,270 B1 | 6/2002 | Frank | |
| 6,442,799 B1 | 9/2002 | Duarte | |
| 6,739,145 B2 * | 5/2004 | Bhatnagar | 62/127 |
| 7,126,474 B2 * | 10/2006 | Ingram et al. | 340/545.6 |
| 7,249,050 B1 * | 7/2007 | Walker et al. | 705/14 |
| 7,418,971 B1 * | 9/2008 | Ingram | 134/172 |
| 7,637,365 B2 * | 12/2009 | Ringdahl et al. | 194/205 |

(Continued)

*Primary Examiner*—Gene Crawford
*Assistant Examiner*—Michael K Collins
(74) *Attorney, Agent, or Firm*—Stephen D. Carver

(57) ABSTRACT

Coin operated vending machines and vending methods for self service car washes that vend different commodities or services at a united price. The machines vend vacuum at different speeds, and spot remover or fragrance. Each machine has a computer-controlled, multi-segmented bar graph providing an analog indication of the amount of a vend that remains, and a dot matrix system for displaying text messages. The bar graph has multiple adjacent segments each having multiple cells that contain separate LEDS of different colors. The bar graph provides a relative, analog indication of the amount of a particular commodity remaining to be vended. When a vend starts, all of the bar graph segments are illuminated and as vending continues, bar graph segments and individually cells are sequentially decremented. Different products are associated with different colors. The customer may switch selections while a credit balance remains, and bar graph illumination is reset to 100%.

3 Claims, 30 Drawing Sheets

U.S. PATENT DOCUMENTS

2006/0063580 A1* 3/2006 Nguyen et al. ................ 463/16
2007/0026916 A1* 2/2007 Juds et al. ..................... 463/1
2007/0170195 A1* 7/2007 Segiet et al. .................. 221/15

* cited by examiner

| Fig. 10 | Fig. 11 |

Fig. 12

| Fig. 13 | Fig. 14 | Fig. 15 |

| Fig. 21 | Fig. 22 |

Fig. 23

MULTIPLE SERVICE VENDING MACHINE WITH UNITIZED PRICING AND PROPORTIONALIZED ANALOG DISPLAY

BACKGROUND OF THE INVENTION

1. Field of the Invention

The present invention relates generally to vending machines adapted for deployment at self-service car washes that dispense a plurality of customer-selected services or commodities, such as vacuum suction, fragrances, cleaning solutions such as spot remover and other items. More particularly, this invention relates to vending machines that output different volumes or quantities of a selected commodity in response to a preselected uniform input price.

2. Description of the Related Art

The self-service car wash industry continually improves the quality and quantity of products and services that are offered to customers. Products such as vehicle waxes, detergents, cleaners and related items are commonly sold from self-service "coin-operated" vending machines of numerous available sizes, configurations and shapes. Typically, these machines are mounted upon custom-designed concrete "islands" that are usually erected close to the washing bays within illuminated, high visibility areas. (As used herein the term "coin-operated" refers to self service vending machines that accept coins, credit cards, currency, tokens, or combinations thereof.)

Besides offering the consumer several cleaning options related to the vehicle exterior, typical self-service car wash installations offer a variety of products and choices relating to the vehicle interior. For example, numerous coin-operated suction-applying vacuuming systems exist. Various carpet cleaning and spot removal products are available for more vigorous interior cleaning. Various towels, dashboard cleaning solutions or preparations, various waxes, deodorants, and other diverse automotive items are typically stocked by well-equipped vending installation. Coin-operated vending machines that dispense fragrances and apply them to the vehicle interior are becoming relatively common. They are often deployed in convenience stores and other locations apart from car wash installations.

Most commodities or products are vended at different prices and different rates. Different products or services are normally priced differently as their cost is usually different. During a vend, varying commodities or products will be outputted at different rates or pressures, and for different times. Given this prior industry practice, typical vending machine display a somewhat complex menu offering different products or services at different prices which are vended for different time intervals. In some cases consumers can be confused.

Not only are different products or services available from modem vending machines, but different volumes or rates of application are possible for given items. For example, a vending machine sold under the trademark SELECT-A-VAC by the instant assignee, Fragramatics Mfg. Co, Inc of Pine Bluff Arkansas, provides suctioning vacuum at different customer-selectable rates. Thus, the customer can select a first pressure for normal cleaning and a higher suction pressure for more demanding cleaning applications. Mechanically, the machine operates a single motor for normal vacuum, and at least one additional suction motor for heavy duty vacuuming. Formerly the machine outputted vacuum at a first pressure for a displayed price (i.e., approximately fifty cents to over a dollar) for a given time period of approximately three to four minutes. Higher pressure vacuuming was offered at a greater price for a shorter period of time. Pricing details concerning these options are typically displayed on the external machine menu, which is highly visible to the customer.

It became apparent that, in the middle of a vend, customers desired to change selections from the originally selected commodity or service to another offered by the menu. In other words, after inputting a given amount of money into a vending machine and starting the cleaning process, customers often wished to select an alternative product or service without first depleting their credit from the initially selected vend and then re-inserting coins or currency. And, while vacuuming, some customers wished to change from low pressure suction to high pressure suction before the money originally deposited in the machine was depleted.

At the time the above describe phenomena was recognized, a common vending machine design practice was to visually display the amount of remaining time to the customer during a selected vend interval. For example, a simple computerized timer would respond to the customer's inputted cash amount, recognize the selected product or commodity, compare the pricing parameters for the latter with the cash value that was deposited, and display and decrement the time that a customer's desired vend was to be active. Without modifications to the computer timer circuitry and software, it would not be practicable to allow switching between different products or services vended at different rates and times within the middle of a vend, since proper computation and display of the remaining time for the modified vend would be problematical.

At least in part in response to the above-described vending machine display considerations, the subject matter of U.S. Pat. No. 5,371,681, issued Dec. 6, 1994, was developed. Vending machines using the timers and technique described in this patent can respond and react to the selection of various different vending commodities or services during the vending process by recalculating an amount of time that remains for the vend that is proportional to the decremented amount of money originally inputted into the machine. A modified timing display is derived by comparing the remaining amount of customer credit to the timing and pricing parameters associated with the newly selected commodity or service. The newly calculated amount of customer vend time is then displayed.

The circuitry described in the above patent initially detects the customer selection of a first item, which is offered for a given period of time for a first predetermined amount of time and detects the amount of money the customer deposited. Then a first period of time is computed and displayed, which indicates how long the first item will be outputted. While the initially selected vend progresses, the customer selection of a second vending service or commodity is detected. The second vending commodity or service is vended as a function, at least in part, of a second predetermined amount of time based upon the decremented value of money remaining after vending of the first item, and the timing and pricing parameters associated with the secondly chosen item to be vended. The second period of time during which the secondly-chosen commodity can be provided is calculated and automatically displayed.

For example, in a 1999 model SELECT-A-VAC™ vending machine developed and manufactured by Fragramatics Mfg. Co. Inc., the instant assignee, the aforementioned timer facilitated a series of machine that offered only two selections: fragrance and vacuum; spot-remover and vacuum; and, high and low speed vacuum. Pricing for a fragrance/vacuum machine could be as follows:

(a) Vacuum motor applied suction for four minutes for a price of Seventy Five Cents ($0.75); or, (b) Spray-applied fragrance for One Dollar ($1.00) for forty seconds, wherein approximately twelve (12) ml. of liquid fragrance of a customer-selected scent was dispensed.

An alternative machine offered the following:

(a) Vacuum motor applied suction for four minutes for a price of Seventy Five Cents ($0.75); or, (b) Foaming brush applied spot remover for One Dollar and a half ($1.50) for three minutes.

An alterative embodiment of the earlier machine offered twin vacuum selections:

(a) Low suction with a pair of vacuum motors for four minutes for a price of Seventy Five Cents ($0.75); or, (b) High suction from three vacuum motors provided for three minutes at a price of One Dollar ($1.00).

Former Fragramatics' machines using timers built according to U.S. Pat. No. 5,371,681 suffered from two relatively recently-recognized disadvantages. First, the pricing schedule displayed on the menu is potentially confusing, as can be realized from the above machine offerings. Since the selected commodities have different physical forms, vendor costs, and parameters, the usual practice has been to offer them at different prices, and there is an argument that customers expect this. However, we have determined that a customer would rather be faced with a unitary pricing schedule. It is desirable that a fixed amount of money should provide the customer with a certain portion of any vend selection. In other words, by way of example, for One Dollar, the customer should have the option of receiving a certain volume or portion of any of the services or commodities offered by the machine. The internal computer circuitry can take care of the accounting differences. Thus unitary pricing is a design goal.

Secondly, metering of vending machine output has previously been accomplished by calculating and displaying the time remaining to a customer during a given vend. As mentioned, the timer described in U.S. Pat. No. 5,371,681 continuously calculates and displays the remaining "absolute time" associated with a given vend. This occurs while enabling the customer to switch between different vend selections after initially activating the vending process. As a result of customer and product study and evaluation it has been determined that the digital display and recalculation of remaining time associated with a vend does not significantly contribute to customer satisfaction. It is recognized that self service car wash customers require some form of product metering to effectively manage the cleaning process, the digital display of the absolute time remaining is not as effective as the analog display of the relative amount of selected product to be vended. In other words, it is unnecessarily confusing to customers to compute the amount of time remaining in a vend, whether prorated or otherwise. For example, the digital display showing the remaining time is difficult to see while, for example, a customer is kneeling within his or her automobile and vacuuming. Secondly, it is not advantageous or desirable to display the absolute amount of time remaining in the vend; recently we have discovered that it is more effective to display the relative amount of a selected commodity that remains, rather than an indication of time.

Thus, it is desirable to provide unitized pricing and to display the relative amount of product remaining independent of time. For example, we have found it desirable to provide a menu of options as follows:

(a) Low suction with a single vacuum motor four minutes for a price of One Dollar ($1.00);

(b) High suction by running more than one vacuum motor for three minutes at a price of One Dollar ($1.00); and/or, (c) Spray-applied fragrance for approximately forty seconds maximum, wherein approximately twelve (12) ml. of liquid fragrance is dispensed, for a price of One Dollar ($1.00).

While providing these options, and while enabling the customer to switch between them at any time while credit remains, it is desired to display an indication of the relative amount of selected product remaining at any point in time. The display should be analog so it is highly visible from a distance.

SUMMARY OF THE INVENTION

The new vending machines are used in self service car wash installations, and are adapted for "coin operation." The preferred machines vend suction for vacuuming at two different speeds. One machine additionally vends spot remover and the alternative machine vends fragrances. Each machine has a computer-controlled electronic bar graph comprising multiple segments that can be separately illuminated. Each segment has multiple cells, each of which includes a pair of light emitting devices, preferably LEDs, characterized by separate primary colors. The bar graphs provide a relative indication of the amount of a particular commodity remaining after a vend is initiated. When a vend starts, all of the bar graph segments (i.e., all cells in all segments) are illuminated to indicate that one hundred per cent of a vend is to be completed. As vending continues, bar graph cells within a given segment are progressively turned off, and each segment is turned off in succession as the vend completes. In other words, successive cells within segments, and successive segments themselves are sequentially decremented as the bar graph operates.

Thus, an analog reading occurs, as the magnitude of the illuminated bar graph is proportional to the percent of a given vend remaining to the customer at any given time. Whenever a customer selects a different commodity or service while a credit balance remains prior to completion of a previously selected vend, the machine delivers the newly selected product and, concurrently, the bar graph is reset. Specifically, the bar graph is fully again illuminated to indicate that One hundred per cent of the new selection is available. As the remaining credit is depleted during the completion of a vend, the bar graph segments are serially turned off, with the various cells of each segment being progressively turned off in a serial fashion until nothing remains to be vended.

The improved vending machines offer a variety of products or services at unitized prices. For example, the machines may offer the customer a choice between suction vacuum at variable suction rates, fragrance, and/or spot remover, all for an initial deposit of One Dollar. Once the customer deposits a dollar and selects an initial commodity or service, the bar graph is fully illuminated to indicate the One hundred per cent of the purchased product is available. As product is vended, the bar graph display contracts, i.e., less and less segments are illuminated, and the declining amount of the selected product remaining to be vended is indicated in analog fashion as a percent of the illuminated bar graph.

No effort is made to display the time remaining with a purchase. Further, different selected products may be associated with different color displays. In effect, the analog display shows the relative amount of selected product remaining to be vended (i.e., or the cash balance remaining as a percentage of the amount deposited). If additional cash is deposited, it is added to the remaining cash balance and the bar graph returns to One hundred percent. If and when a customer switches products, the analog bar graph returns to a One hundred percent display indication, and it is thereafter decremented until customer credit is exhausted. The bar graph is illuminated in proportion to the remaining cash credit due the customer.

In addition to unitized pricing and relative or proportional analog metering, we have provided a digital text scroll that interacts with the menu to aid in customer selection. This indicates customer choices, the amount of money initially deposited, and other parameters associated with a vend. During machine idle time, the scroll can show advertising text, and can initiate a display and attract mode.

Thus, a basic object of our invention is to provide a vending system that is capable of vending multiple customer-selectable commodities or services.

Another basic object is to vend different volumes or amounts of commodities or services in response to a uniform input price.

Another object is to enable the customer to switch between different services or commodities while a given product is being vended, and to be credited with an amount of the subsequently selected product or service that corresponds to customer credit after a switch.

It is also an object of our invention to provide a vending machine of the character described that enables a customer to select varying volumes or pressures of a given commodity, such as vacuum, and to switch between such volume or pressure selections at a desired moment.

Another object of our invention is to provide a vending machine that displays a plurality of text messages to help the user, for example, by explaining different possible selections and indicating the initial cash deposit. It is a feature of our new vending machine that different messages can be displayed for different vend selections and in response to cash deposits.

Another significant object is to compute and generate a visual display whose magnitude directly indicates the remaining quantity of a product or service being vended, which restarts in response to customer selection of a different commodity or service after the initial vend is selected.

Yet another object is to provide a highly visible bar graph that, when fully illuminated, indicates that One hundred per cent of the remaining customer credit as of a time when a different vend is selected or when additional money is inputted remains for the completion of the now-selected commodity or service.

A related object is to provide a multi-color bar graph that is color-associated with a given selectable product or service.

Yet another object is to provide a vending machine of the character described

Another objective of this invention is to present the vending machine customer with an illuminated bar graph in which the number of illuminated segments is proportional to the percentage of the cash balance that is remaining for a given vend. It is a feature of our invention that remaining time is not displayed, but rather that the percentage of a newly-selected vend, starting at One hundred percent, is displayed and then decremented during completion of the newly selected vend.

A related object is to provide an illuminated bar graph wherein the number of illuminated segments is set to maximum when either additional cash is inserted, or when a different vend commodity is selected. The consequence of this is that there is no fixed relationship between the number of illuminated segments and the cash balance or the time remaining.

Another important fundamental object is to provide a vending machine of the character described that is ideal for use with modem, self-service car washes.

Also, it is an important object to provide a vending machine for automotive car-wash products, including vacuum, fragrances, cleaning solutions, and the like.

It is also a basic object is to provide a reliable alarm system ideal for car wash vending machines that sit alone in unattended, dimly lit locations that are subject to relatively high vandalism rates.

Another object is to provide a vending machine of the character described that can be owner-set and reset with a minimum of inconvenience.

Another object is to provide a vending system of the character described that allows a proprietor to drive through an installation with multiple machines and to easily observe what customers are selecting.

These and other objects and advantages of the present invention, along with features of novelty appurtenant thereto, will appear or become apparent in the course of the following descriptive sections.

BRIEF DESCRIPTION OF THE SEVERAL VIEWS OF THE DRAWINGS

In the following drawings, which form a part of the specification and which are to be construed in conjunction therewith, and in which like reference numerals have been employed throughout wherever possible to indicate like parts in the various views:

FIG. 12 is a diagrammatic view indicating how FIGS. 10 and 11 should be positioned for viewing;

FIG. 16 is a diagrammatic view indicating how FIGS. 13-15 should be positioned for viewing;

Figure 20:
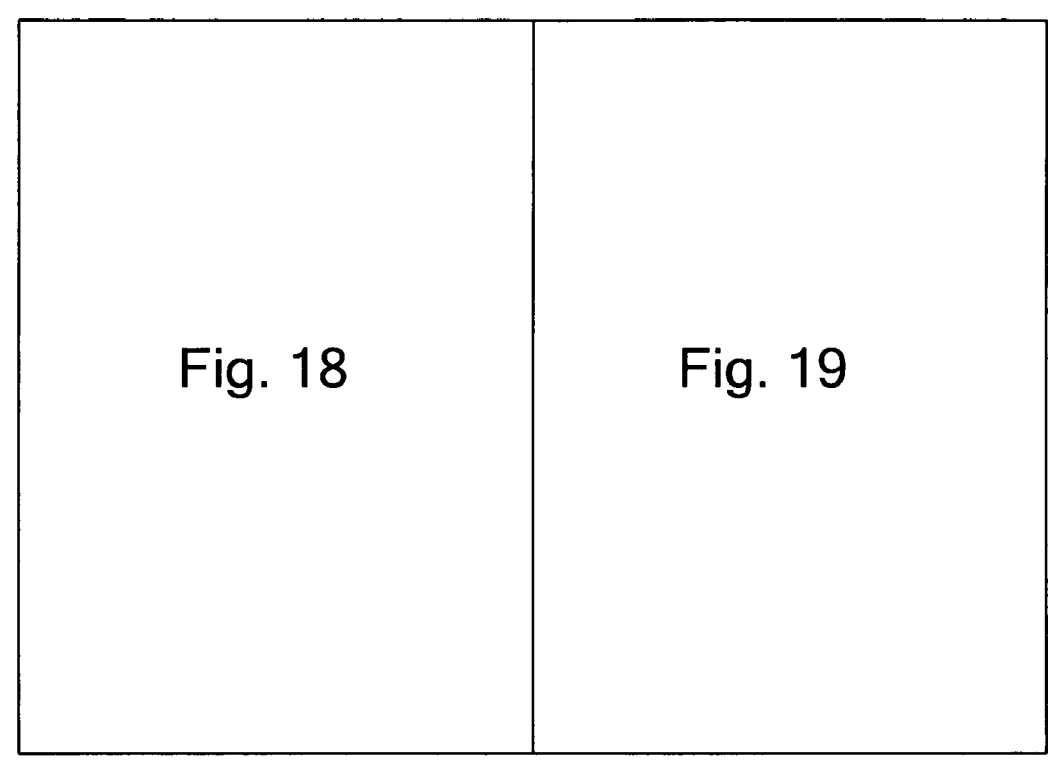

FIG. 20 is a diagrammatic view indicating how FIGS. 18 and 19 should be positioned for viewing;

FIG. 23 is a diagrammatic view indicating how FIGS. 21 and 22 should be positioned for viewing;

DETAILED DESCRIPTION OF THE INVENTION

Figure 1:
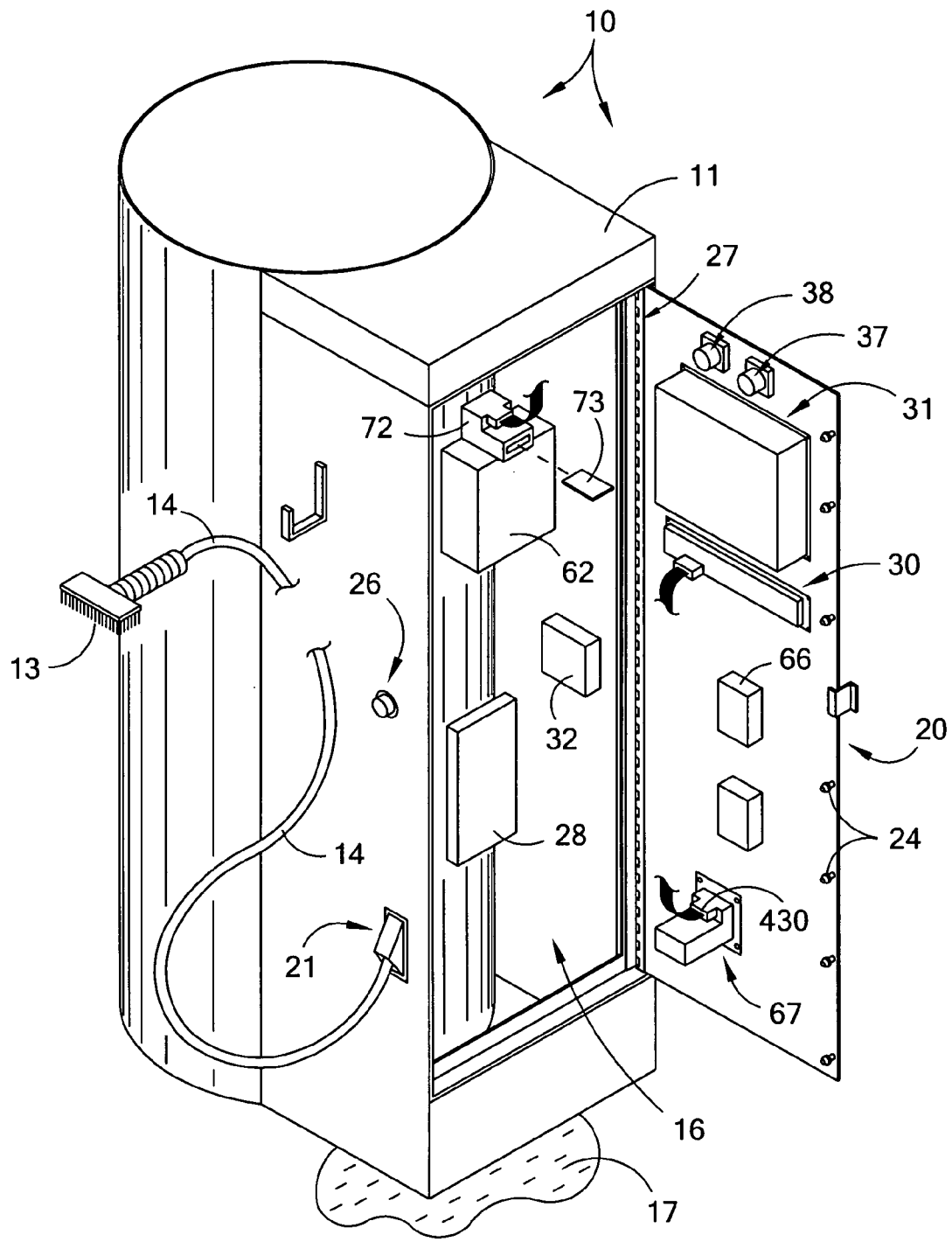
FIG. 1 is an isometric view of a unitized pricing vending machine equipped with our proportionalized analog display.
Figure 2:
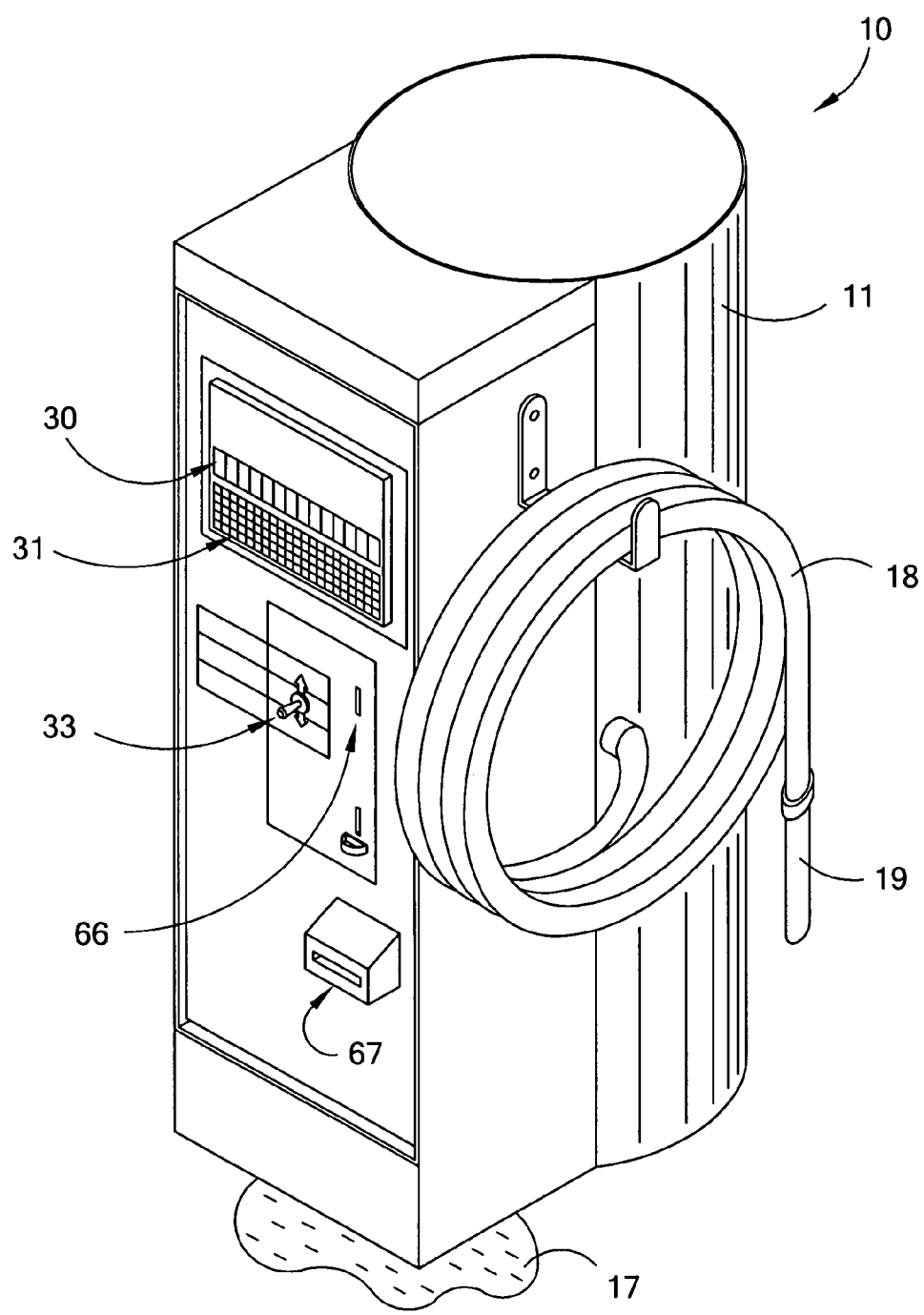
FIG. 2 is an isometric view of the vending machine of FIG. 1 showing the opposite side.
Figure 3:
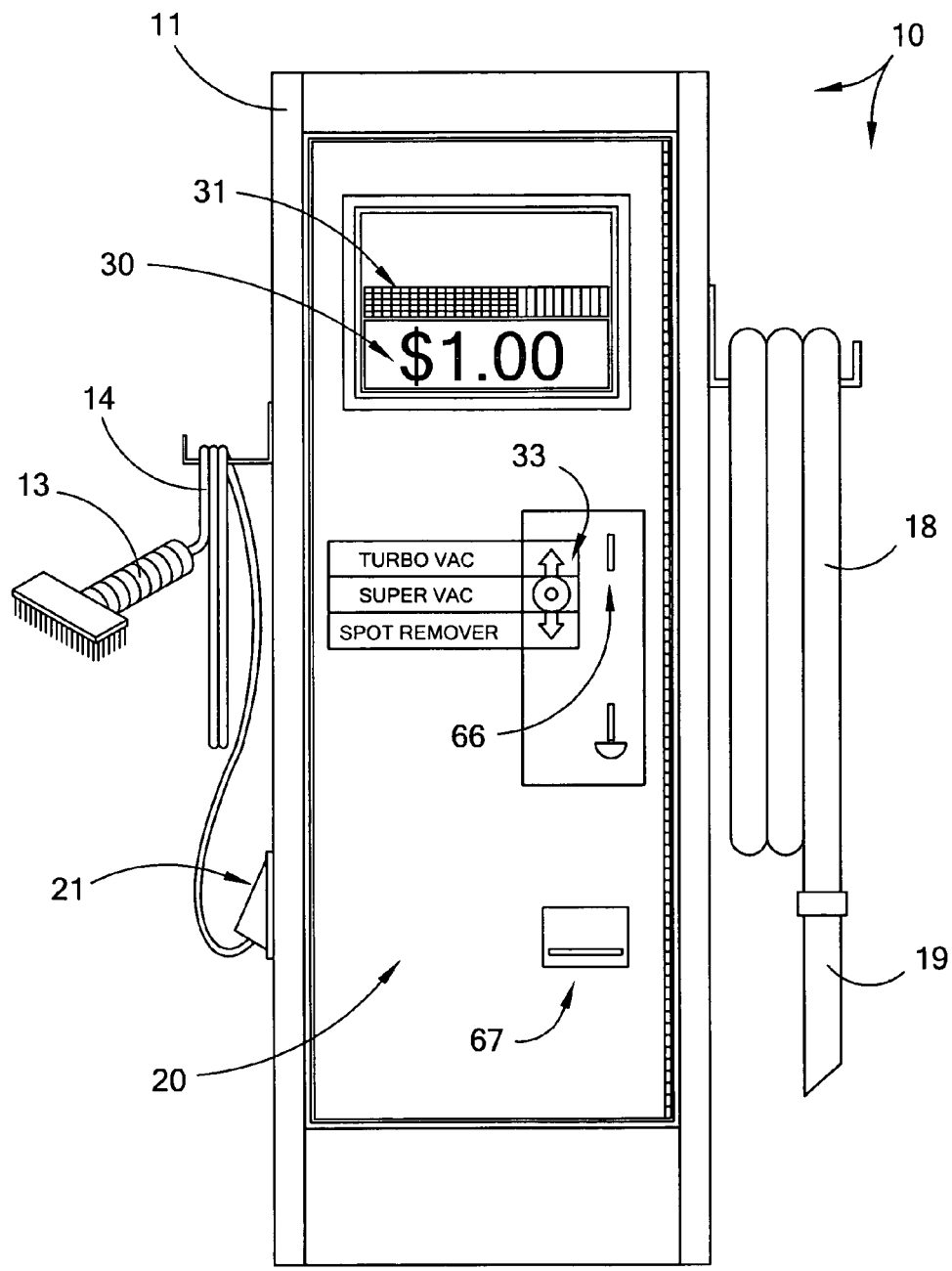
FIG. 3 is a fragmentary front plan view of a vending machine constructed in accordance with the best mode of the invention that dispenses vacuum and spot remover.

With initial reference now directed to FIGS. 1-3 of the drawings, a preferred vending machine has been generally designated by the reference numeral 10. It will be appreciated at the onset that vending machine 10 may be employed to vend a variety of products, but it is preferred for use in self service car wash installations, where it is adapted for "coin operation." The machine 10 is capable of dispensing a variety of commodities and/or services including spot remover, suction for vacuuming, and fragrances. Vacuum suction is available at two selectable speeds in the best mode. An alternative machine 22 (FIG. 4) vends a fragrance of a selectable scent, and two speeds of vacuum as well, but is otherwise identical. Machines 10 and 22 may include a variety of internal parts, shelves, dispenser arrangements, coin-acceptors, dollar-bill acceptors or other typical accessories and features that are known to those skilled in the vending machine arts. Various quantities of liquid products to be vended will be stored within the cabinet as well.

Figure 4:
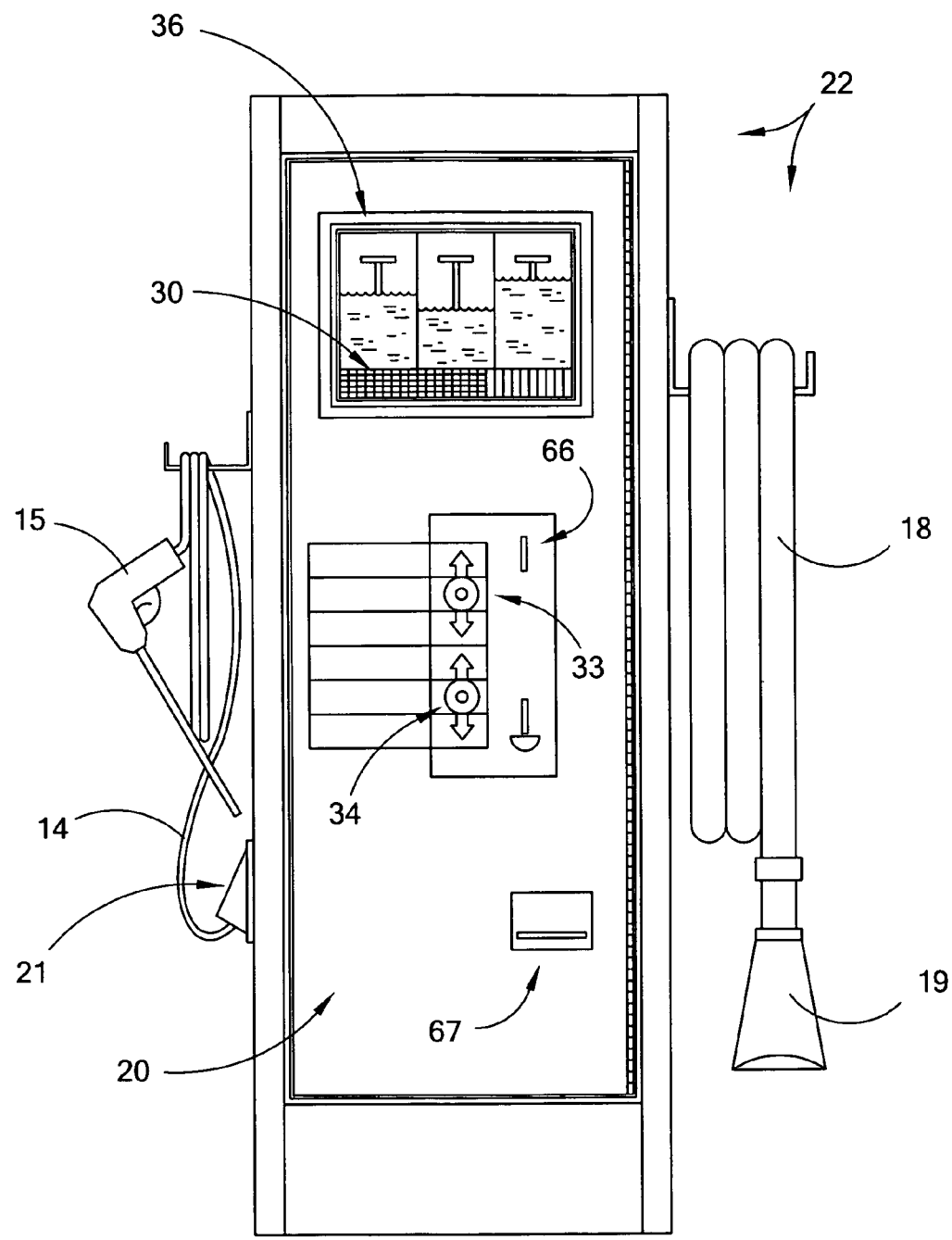
FIG. 4 is a fragmentary front plan view of a vending machine constructed in accordance with the best mode of the invention that dispenses vacuum and selected fragrances.

Both machines dispense vacuum through hoses 18 (FIGS. 2-4) mounted at the right side of the their respective cabinets 11 that are attached internally at a proximal end to internally located vacuum motors within interior 16 (FIG. 1). Distal ends of the vacuum hoses 18 terminate remotely in suitable hand-held vacuuming head fixtures 19 recognized by those skilled in the art. Machine 10 dispenses spot remover solution through a hose 14 that terminates in a hand-held applicator brush 13 (FIG. 1, 3). Machine 22 dispenses a selected fragrance through its hose 14 that leads to a hand-held fragrance applicator wand 15 (FIG. 4).

Preferably, machines 10, 22 control their respective liquid applicator hoses 14 with a special hose fixture 21, that prevents damage by limiting twisting of the hose. Fixture 21 is thoroughly detailed in U.S. Pat. No. 7,418,971, issued Sep. 2, 2008 and entitled "Vending Machine Hose Controller," Ser. No. 11/155,969, which was filed Jun. 20, 2005, and which is owned by Fragramatics Mfg. Co. Inc.

Each vending machine also has a cabinet door 20 that uses a unique mounting system described in a patent application entitled "Vending Machine Cabinetry With Security Locked Double Hinged Door," Ser. No. 10/857,078, filed May 28, 2004, and now abandoned, which is owned by Fragramatics Mfg. Co. Inc. Each door 20 has a plurality of projecting, multi-point pins 24 (FIG. 1) that engages a locking system that can be opened with a lock controller 26. Preferably a double hinge 27 mounts the door 20 to the cabinet 11.

It is also preferred that each vending machine include a suitable alarm 28 (FIG. 1) that monitors one or more sensors 32 (FIG. 1) and operates green and red status indicators 37 and 38 respectively. In the best mode the vending machines each use the alarm described in U.S. Pat. No. 7,126,474 issued Oct. 24, 2006 and entitled "Vending Machine With Remote Control Alarm," Ser. No. 10/974,994, filed Oct. 28, 2004, which also is owned by Fragramatics Mfg. Co. Inc.

For disclosure purposes, the three aforementioned Fragramatics patents and patent applications are hereby incorporated by reference.

The rigid, upright, cabinets 11 are preferably made of stainless steel. Each machine or cabinet is normally disposed upon a suitable supporting surface 17 (FIGS. 1, 2), which preferably is provided by a suitable, elevated outdoor pedestal mounting of conventional design. Plumbing and electrical connections necessary for vending machines of this genre will be available proximate the mounting island, and often they are wired through the island into the interior volume 16 of the vending machine, as recognized by those skilled in the art.

Figure 5:
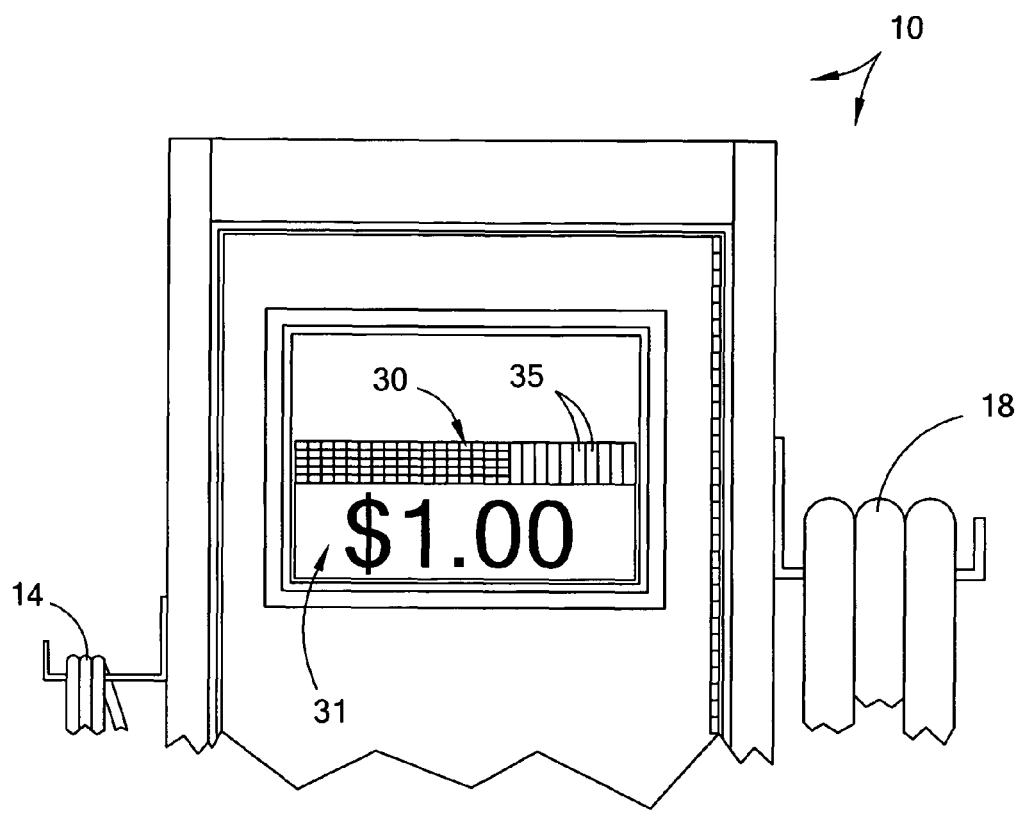
FIG. 5 is an enlarged fragmentary plan view of the bar graph and text display of FIG. 3.

Importantly, as indicated in FIGS. 3-5, each vending machine has an electrically operated bar graph 30, comprising a multi segment display unit mounted on the cabinet front. The purpose of the bar graph is to provide a relative indication of the amount of a particular user-selected commodity that remains at a given time to be vended. Whenever a vend of a given product is first initiated, or whenever the customer switches to an alternative commodity or service while he or she still has a credit balance within the machine after partial completion of a previously-initiated vend, the bar graph 30 is fully illuminated to indicate that One hundred per cent of that available commodity is now to be vended. The bar graph does not indicate remaining vend time (i.e., "absolute remaining time") earned for a given deposit of money, as it is reset to One hundred percent each time a product switch is made while credit remains. Preferably, there is also a multi-segment LED scrolling text display 31 (FIG. 3) at the machine front for displaying idle mode parameters, including pricing, sales offerings and miscellaneous information that is scrolled by and presented to observers.

The bar graph 30 comprises multiple discrete light emitting segments 35 (FIG. 5) arranged in a contiguous fashion to form a straight line. Each light emitting segment can be commanded to emit light using a combination of two primary colors. The intensity of each of the two primary colors is individually controllable. As described in detail hereinafter, the interface to the bar graph is established with synchronous serial communication. Alternatively, the machine can use industry standard serial protocols RS-232 and/or RS-485. The host sends a command string to the bar graph containing three binary, eight bit bytes to specify the number of segments in the bar graph to turn on, the intensity of the first primary color and the intensity of the second primary color. Once the segments are commanded to turn on, they remain on until a new command is received.

The bar graph 30 functions as an optical feedback system to the user, providing analog metering of the proportion of a given selected vend that remains. The preferred vending machines can vend more than one commodity or service. The bar graph does not indicate absolute remaining cash value or time associated with a given vend. Instead, it tells the user how rapidly the remaining cash balance or credit is being consumed.

Preferably the intensity of the two primary colors for each of the illuminated segment of the bar graph will be changed to correspond to the desired mixture of colors for the commodity or service selected. In one embodiment wherein the multi vending system is capable of vending three commodities or services, the bar graph may illuminate the segments using the primary colors of red and/or green. When a first item is selected the bar graph may illuminate the segments using only red light; when a second vend item is selected the bar graph may illuminate the segments with only green light. When the third segment is selected, the bar graph may be illuminated by a combination of both red and green light. In this embodiment, the color of the illuminated bar graph is an indication of the commodity or service being vended and the color acts as a signal to the user regarding which selection has been made.

While the multi vending system is active, the user may elect to deposit additional cash so that the vending operation may be extended. If this is done then, the bar graph will be commanded to illuminate One hundred percent of the bar graph segments using the light color combination for the presently selected vending operation. The number of illuminated segments in the bar graph will be increased to One hundred percent every time additional cash is deposited. As the cash value is consumed by the vending operation, the number of illuminated segments will be decreased at a rate proportional to the rate at which the balance is being consumed by the vending operation.

Figure 6:
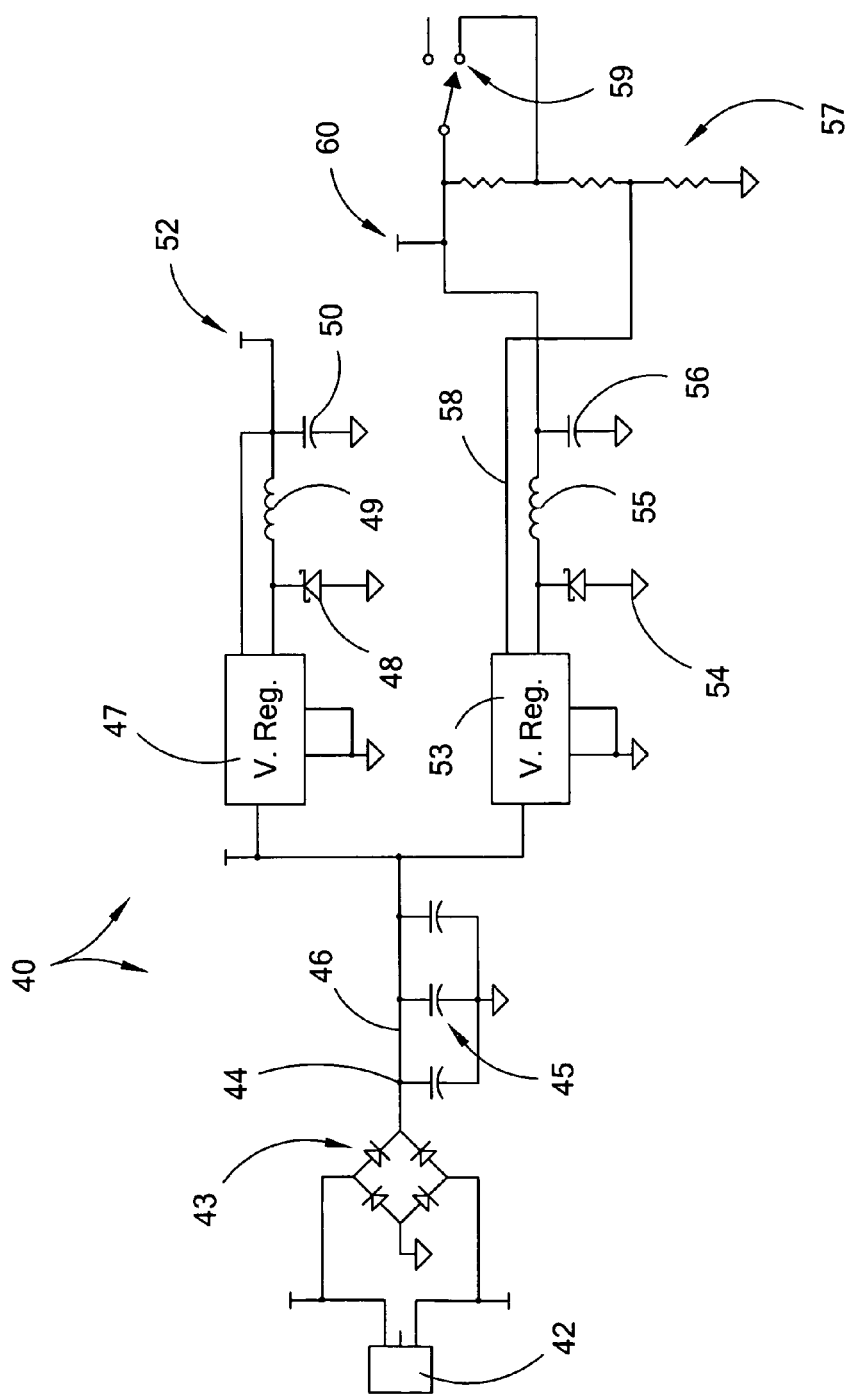
FIG. 6 is an electrical schematic diagram of the preferred power supply.

Referencing FIG. 6, the circuit block diagram of the regulated power supply is indicated generally by the reference numeral 40. Electrical power is derived from twenty-four volt A.C. delivered from a power transformer mounted on the machine chassis that is routed from the relay board (i.e., FIGS. 24, 25) to connector 42 (FIG.6). A.C. voltage applied across diode rectifier bridge 43 (FIG. 6) outputs approximately thirty-three volts D.C. on line 46 across filter capacitors 45 on node 44. Line 46 (FIG. 6) delivers voltage to a switching voltage regulator 47 that outputs across Zener diode 48 and through coil 49 across filter capacitor 50 to provide a five volt output at node 52.

Voltage on line 46 (FIG. 6) reaches an adjustable, switching voltage regulator 53 that outputs across Zener diode 54 and through coil 55 across filter capacitor 56 to provide two selectable voltage outputs. Feedback to regulator 53 occurs on line 58 from the voltage divider 57. An 8.9 DC voltage output is derived on node 60 by setting jumper 59 to the closed position illustrated. The voltage at node 60 can be increased to approximately 14.3 volts DC by removing the jumper 59. Further details of suitable power supply circuitry including an optional backup battery system can be seen in U.S. patent application, Ser. No. 10/974,994 referenced above and incorporated by reference herein.

Again referencing FIG. 7, vending machine operation is controlled by software described later running in a microprocessor on the main controller 62, illustrated schematically or in block form in FIGS. 7, 10 and 11 and seen physically in FIG. 1. Controller 62 initiates external hardware via a vend control board 69, and initiates the LED remote display 31 in step 63, the bar graph 30 in step 64. An optional audio enunciator step is fulfilled by module 70. As explained earlier, the bar graph 30 functions as a relative meter or indicator. Bar graph illumination represents a proportion only of how much of a selected vended product is left to the consumer. In other words, full illumination of the bar graph indicates at a given occurrence that One hundred percent of a newly selected product is left, and as the vend completes, a lesser quantity of segments on the bar graph are illuminated.

Main controller 62 responds to input signals from a user vend select control board 65, operated by front-mounted mechanical user-selection switch 33 (FIGS. 3, 4) that normally enables the selection of two vacuuming speeds, and either spot remover (FIG. 3) on machine 10, or fragrance from machine 22 (FIG. 4). If with machine 22 fragrance is chosen with user selector switch 33, the desired scent is chosen with user selector switch 34. Both switches 33, 34 are preferably SPTT toggle switches (i.e., both can assume three positions). Conventional off-the-shelf coin acceptor 66, and a conventional bill acceptor/reader 67 are also included. The smart card reader 72 (FIGS. 1, 7) is physically mounted within the cabinet interior 16 atop the computer 62. A smart card 73, sized like a typical credit card, can be placed within card reader 72 (FIGS. 7, 27) to reprogram the computer flash memory (i.e., FIG. 17) with operating software as hereinafter described.

In the best mode vending machine 22 also has an optional analog, multi-colored display 36 on its top. A typical display of this type is seen in U.S. Pat. No. 4,527,713, the disclosure of which is incorporated by reference herein.

The main controller 62 has the ability to accept and forward to a host certain data received from a credit card reader 75 and/or to initiate electronic funds transfer as though electronic funds transfer module 68 (FIG. 7) through a conventional keypad, forwarding this data to a host CPU via a serial communications port 71. Coin acceptor 66, bill acceptor 67, module 68, and credit card reader 75 (FIG. 7) are jointly and currently referred to herein as payment acceptors.

Figure 8:
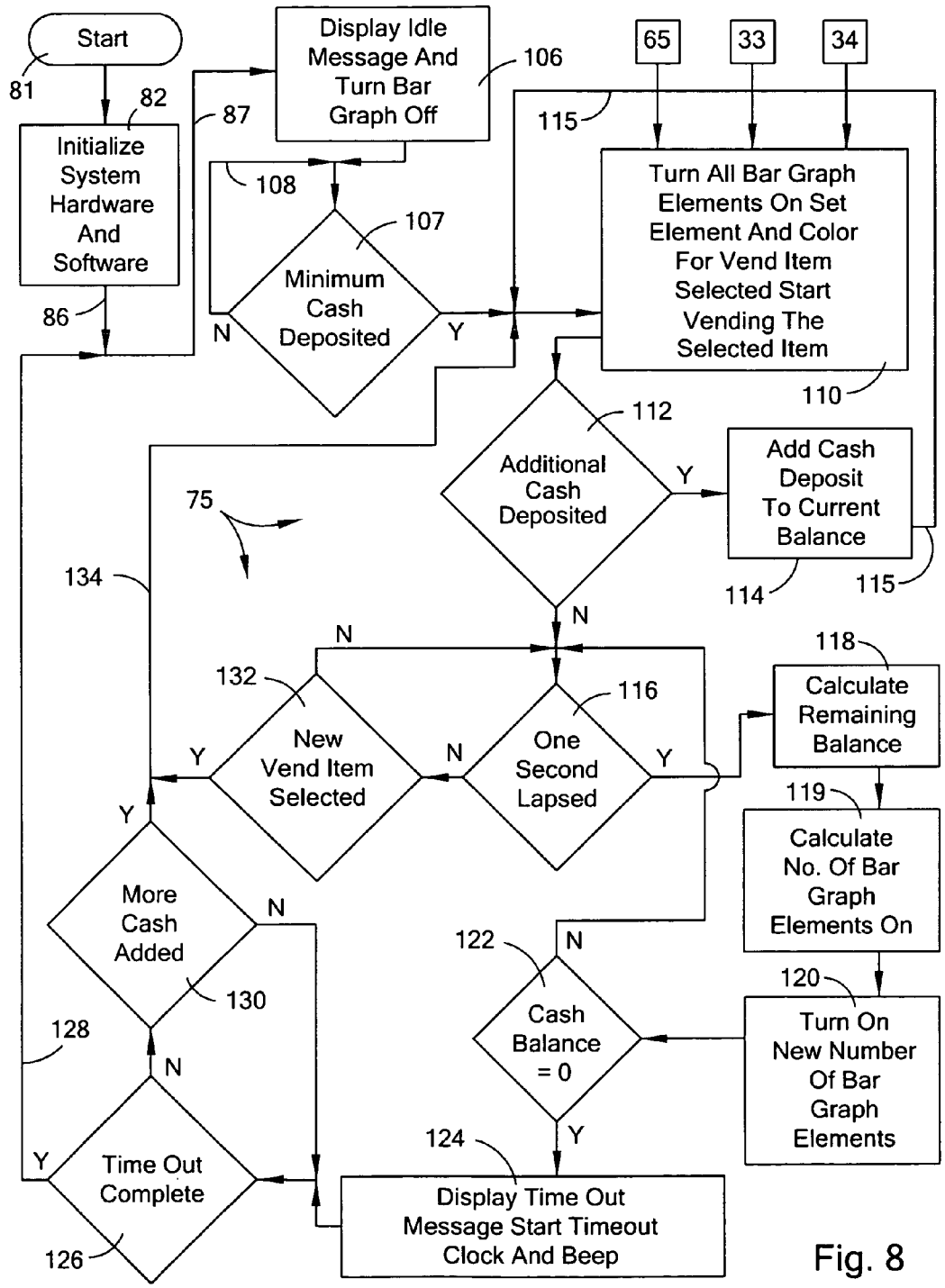
FIG. 8 is a software flow chart of the machine logic.

When power is first applied, the firmware starts program 76 detailed in FIG. 8. The "start" step is indicated at block 81, which is followed by initialization step 82 detailed in FIG. 9. Step 82 (FIG. 9) initializes all of the input/output ports in step 83. Smart card detection occurs in step 84. By virtue of the smart card arrangement we have employed, the owner or proprietor of the vending machine can quickly adjust various internalized vending machine parameters. The smart card 73 contains updates that change the display messages scrolling on external digital LED text display 31, and several program parameters. Representative program parameters that can be changed with the smart card include the following: the value of a coin that might be accepted by the coin readers; the minimum number of coins to accept before starting, and the value to charge for each commodity every second.

Figure 7:
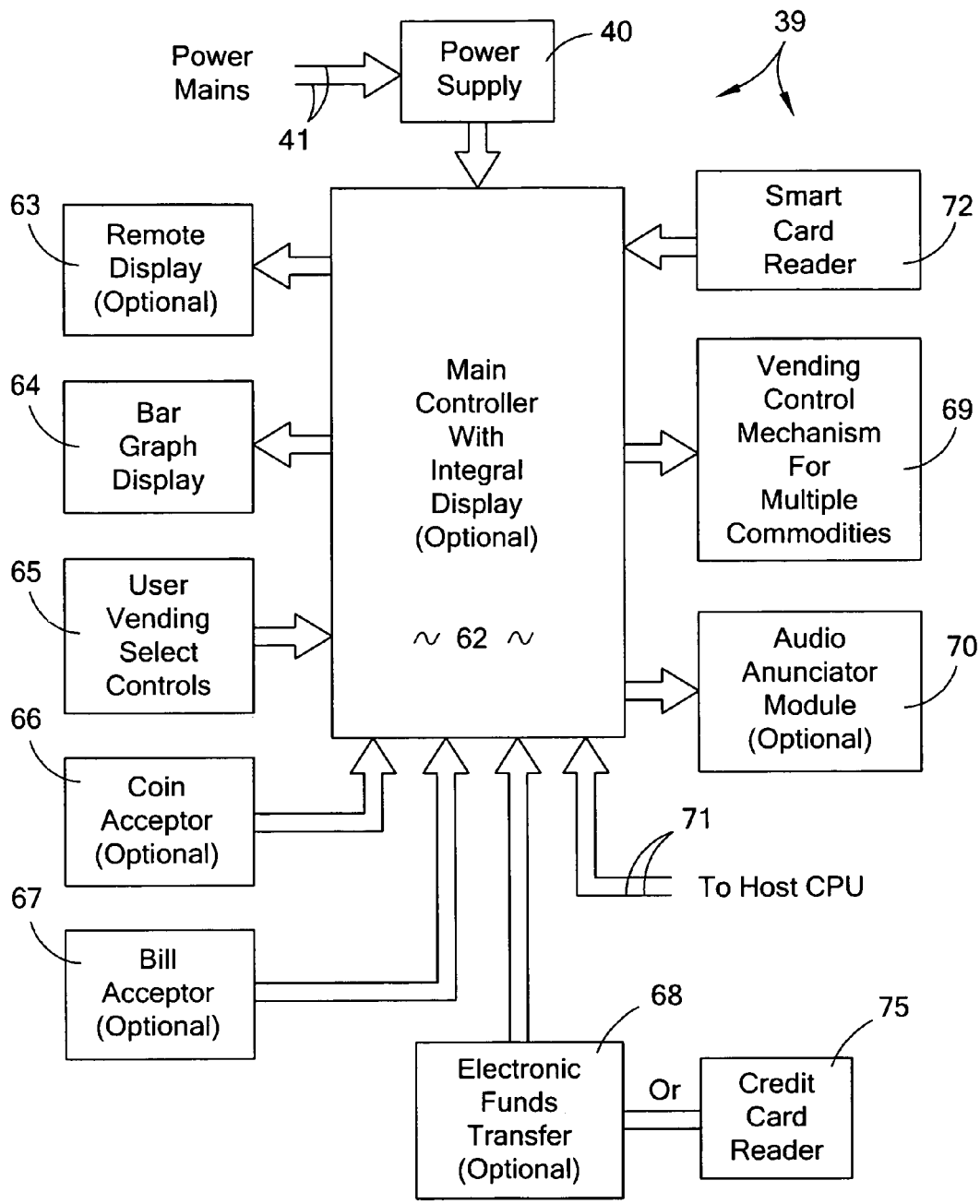
FIG. 7 is a system block diagram.
Figure 9:
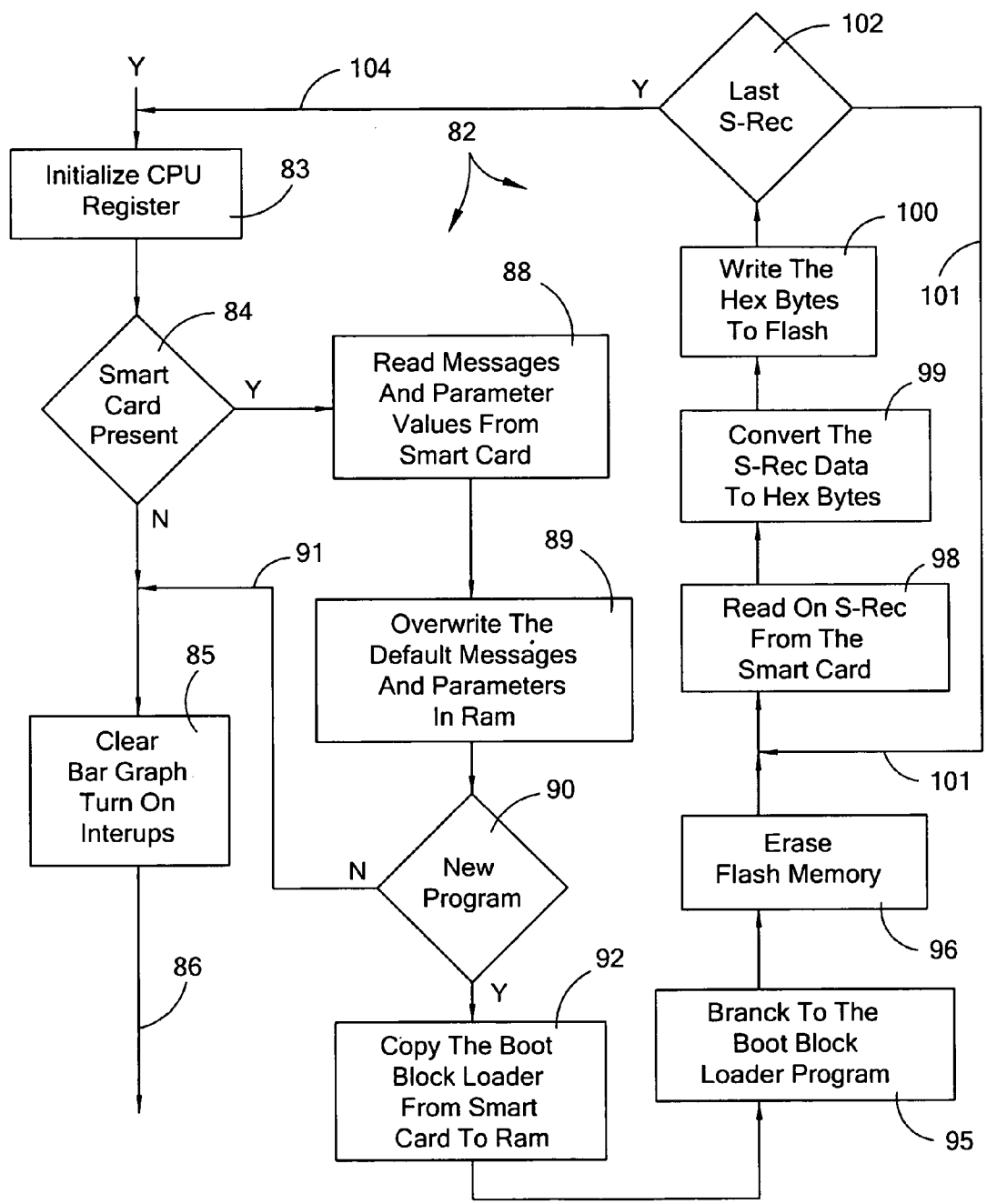
FIG. 9 is an expanded software diagram detailing the initialization block of FIG. 8.
Figure 27:
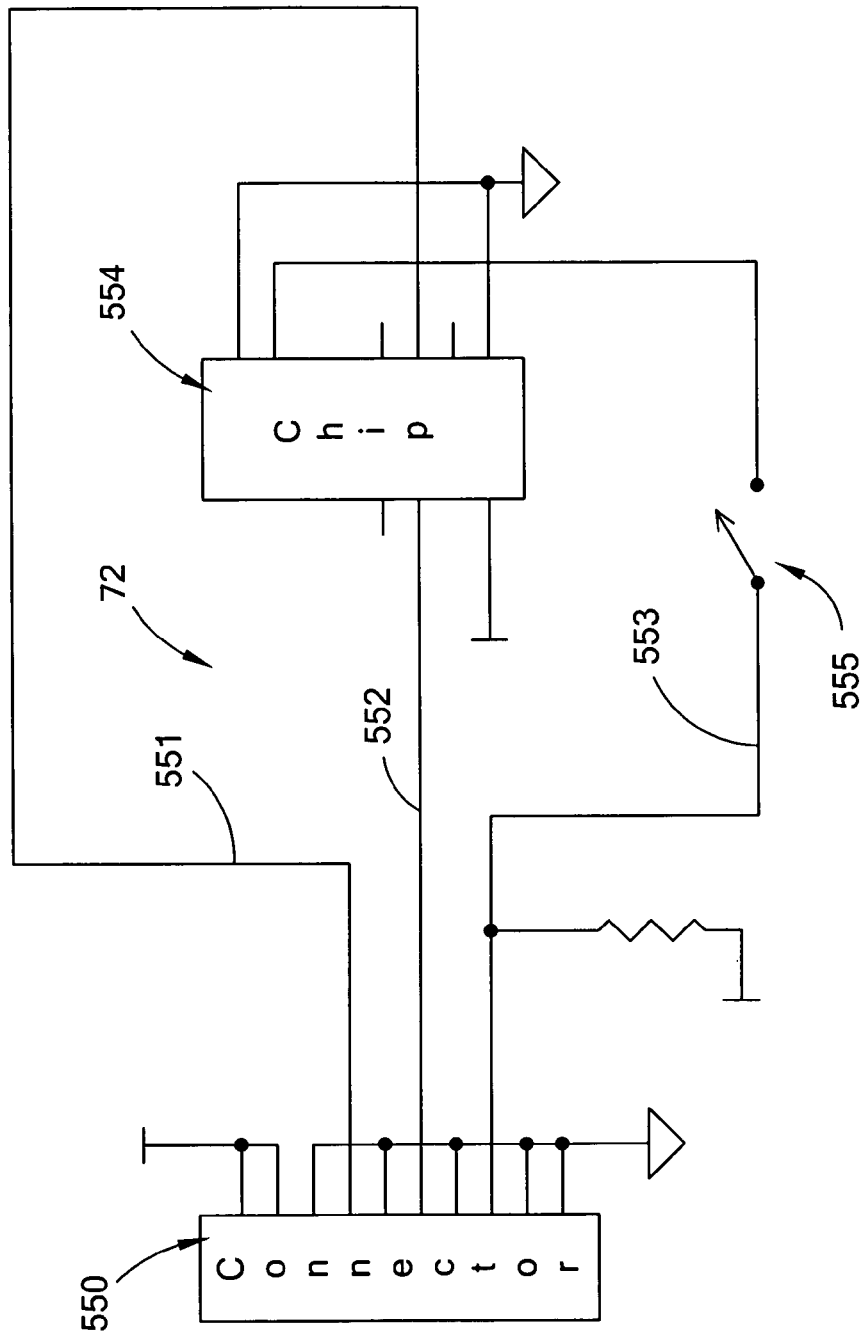
FIG. 27 is an electronic schematic diagram of the preferred card reader circuitry.

For a smart card 73 to be detected, it must be placed within the smart card reader 72 (i.e., FIGS. 1, 7, 27). If no smart card is detected in software step 84 (FIG. 9), the vending machine knows that no changes are needed prior to starting the machine. Step 85 follows, in which the bar graph 30 will be cleared and interrupts will be turned on. Line 86 in FIG. 9 and lines 86 and 87 in FIG. 8 indicate the return. However, if a smart card is detected in step 84, the firmware reads the contents of the smart card in step 88 (FIG. 9). The parameters read from the smart card are then placed into RAM in step 89, overwriting of the normal default values. (If no smart card is present then, the normal default values are used.) Referring again to FIG. 9, after the parameters from a possible smart card have been detected and RAM has been thereafter updated in step 89, the program determines in step 90 if the smart card contains new firmware to be loaded into flash memory. An example of possible new firmware is a modified or updated message to be scrolled on the LED display 31. If car wash establishment owners, for example, desire new blocks of display text to be displayed, these changes can be quickly and efficiently implemented by issuing them a new smart card that implements the desired changes. The revision level of the firmware on the smart card is compared to the revision level of the firmware running in flash memory. If there are no new software features within the smart card, the program returns via line 91. If the revision levels are older and different than the firmware on the smart card, step 92 will load the new program into flash memory. Also, if the smart card contains new firmware, step 92 will also activate a boot block loader step 95. The boot block loader will be loaded into RAM and then executed.

When the boot block loader runs, it will first erase the flash memory in step 96 then proceed to read the remainder of the smart card, which contains the firmware code. Records are read in step 98. The data records are stored in a RAM buffer, as indicated by step 100. Step 102 determines if the last records have been processed. Noting return 101 (FIG. 9), steps 98, 100 and 102 repeat until the last record has been completely read and recorded. When the last record has been copied to flash memory (i.e., in repeated step 100), the program will branch to the start up vector at address 0x000000, as indicated by return 104 This will cause the new program code in flash memory to execute.

Step 106 (FIG. 8) then proceeds and initializes the program variables, turns off all segments of bar graph 30 and then presents the preprogrammed idle message to the LED display 31. The program then proceeds to step 107, that continuously monitors the signals from the bill and coin acceptors 66 and 67 (FIG. 7) to determine if money has been deposited. If there is no deposit, the idle loop 108 is repeated.

When step 108 detects a customer, i.e., as soon as the minimum cash has been deposited in either the bill or the coin acceptors 66, 67, the program proceeds to step 110. Optional electronic funds reader 68 (FIG. 7) or smart card reader 72 may be monitored as well. The bar graph 30 remains totally off until the minimum cash has been deposited. As each coin or equivalent is deposit by the user, the total amount deposited is displayed on the LED display 31 for seven seconds, then a prompt message scrolls until another coin is deposited. Step 110 also responds to the customer selection vend controls 65 (FIG. 7) including inputs from customer-activated mechanical selection switches 33 and 34 at the front of the machines 10 or 22. Once the program determines which of the commodities is currently selected by the customer, segments of the bar graph 30 (and individual LEDs within segment cells) are activated with the appropriate color designated for that commodity, and dispensing of the selected commodity commences.

After the minimum cash has been deposited, the program proceeds to step 112 where it determines if additional cash is being deposited. If additional cash is deposited step 114 adds the additional cash to the current customer balance and returns as indicated by line 115. Thus, after a commodity has been selected by operating the user selector switches 33 and/ or 34, all forty cells in the bar graph 30 are illuminated, thus making each segment of the bar graph represent 2.5 percent of the cash balance at the time the user selector switch was activated. If in step 112 no additional cash deposit is made by the user then the program proceeds to step 116 (FIG. 8).

In step 116 the program delays one second and proceeds to steps 118, 119, and 120. In these steps, the program determines how much remaining cash balance there is and calculates what percentage this balance is of the original balance that was present when the user activated the user selector switch 33 and/or 34. Then, using that percentage, the program calculates the number of segments that should be illuminated on the bar graph 30 and sends a command to the bar graph to make it illuminate the corrected number of LEDs. As the user's cash balance decreases, the number of segments (and LEDs) in the bar graph will be reduced in the same proportion, so an analog display correlated to the amount of a selected product or service to be vended is visually made.

After executing step 110, the program 76 (FIG. 8) then determines if the user's cash balance has decreased to zero in step 122. If the cash balance has not decreased to zero then, the program proceeds back to step 116 where it once again checks to see if a full second has passed. If the cash balance has decreased to zero in step 122 then the program proceeds to step 124 where an audible beep produced by annunciator 70 (FIG. 7) will be sounded ten times, and a timeout message will be displayed on LED display 31 to prompt the user to deposit additional cash for additional time. Then program 76 proceeds to step 126 that determines if the time out grace period has fully lapsed. If the time out grace period has lapsed then the program returns to step 106 as indicated by line 128, and from there it proceeds to the idle step 107/108. If the time out grace period has not lapsed in step 126 then the program checks to see if additional cash has been deposited in step 130. If no additional cash has been deposited the program proceeds to repeat steps 126 and 130 until either the time out grace period has fully lapsed or additional cash is deposited by the user. If additional cash is deposited in step 130 then, the program proceeds to step 110 where the start up sequence is repeated and the commodity is allowed to continue dispensing.

Program 76 (FIG. 8) senses whether or not the customer switches his selection in the middle of a vend. If a full second has not lapsed in step 116 then, the program proceeds to step 132. There it checks the user selector switches 33/34 to see if a different commodity has been selected. If a different commodity has not been selected then the program repeats steps 116 and 132 until either one second has lapsed or the user selects a different commodity. If a new commodity is selected the program proceeds to step 110 as indicated by line 134, and the bar graph display 30 is updated to reflect the color for the selected commodity and all of the segments in the bar graph are again illuminated. In this manner an analog indication of One hundred percent is symbolized by the bar graph.

Figure 10:
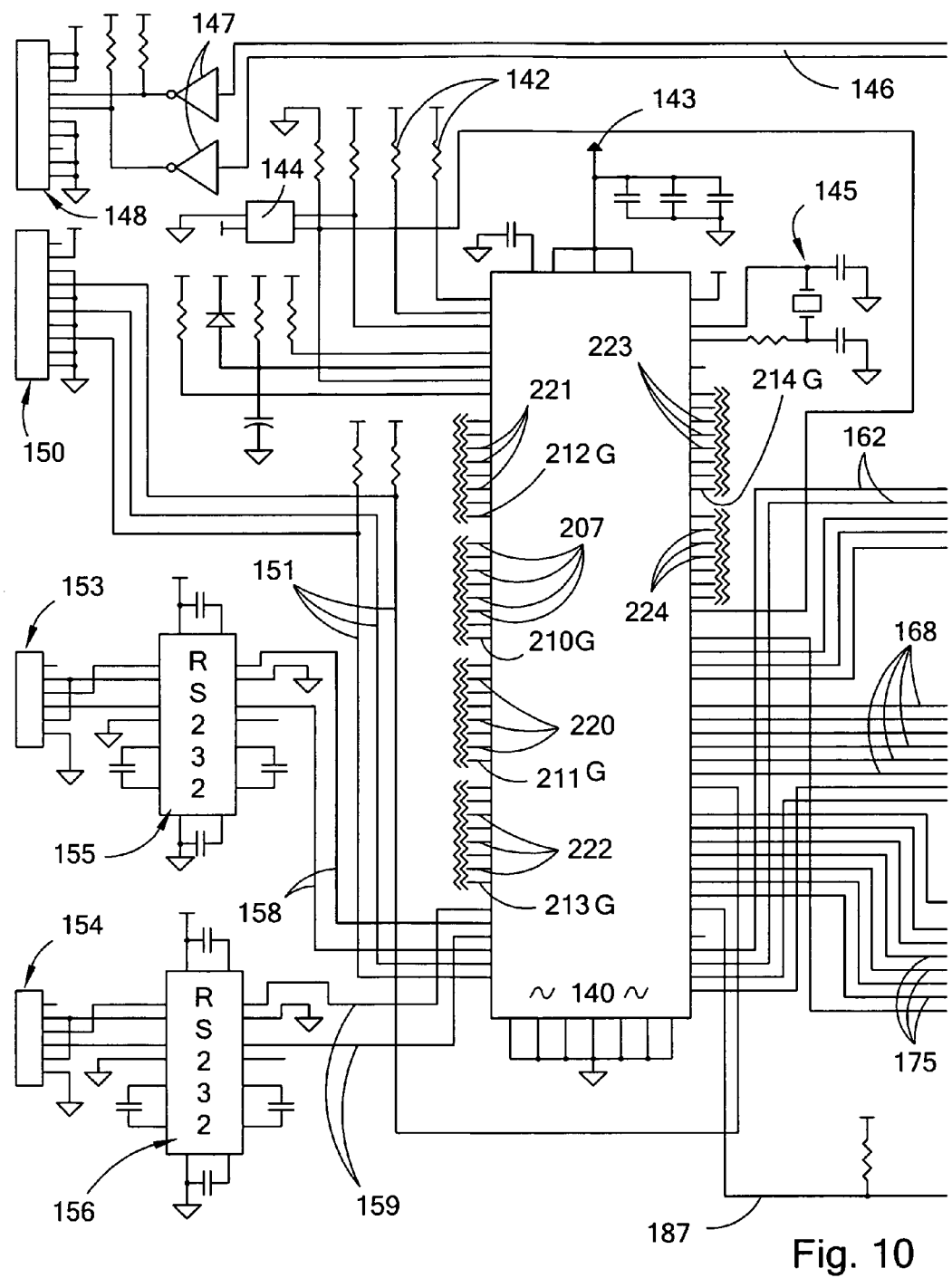
FIGS. 10 and 11 are electronic schematic diagrams of the preferred system controller.
Figure 11:
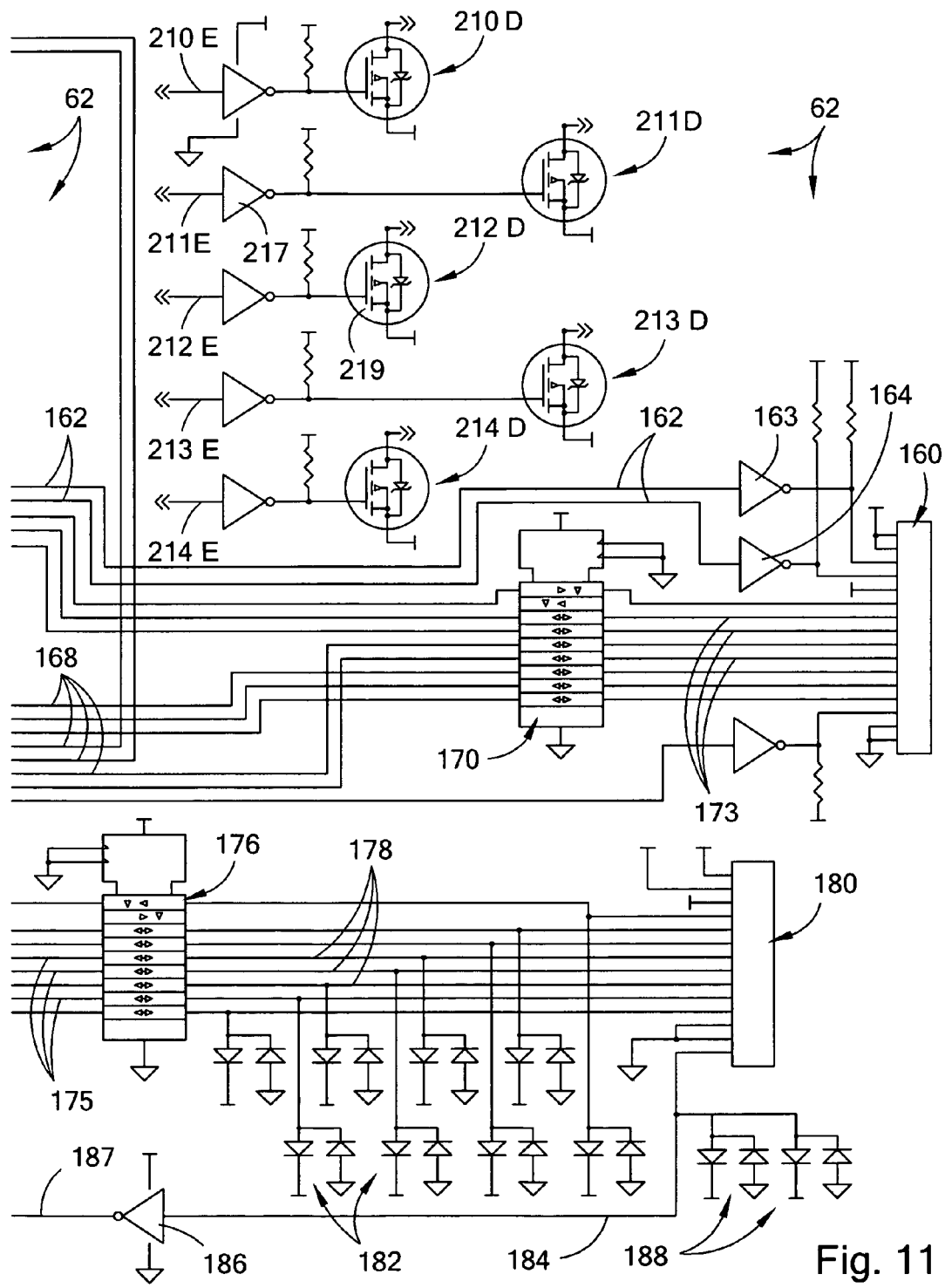

FIGS. 10 and 11 should be positioned as shown in FIG. 12 for viewing. The main controller 62 discussed previously comprises a CPU 140 that responds to numerous inputs and provides numerous outputs. Five volts is delivered through source resistors 142 and input node 143. Initial factory programming is enabled by the dual jumper block 144. The crystal-controlled clock oscillator circuit is designated by the reference numeral 145. Outputs to the bar graph occur on lines 146 and are transmitted via inverters 147 to a connector 148. Inputs derived from the smart card reader 72 discussed earlier are received from connector 150 (FIG. 10) and transmitted to CPU 140 via lines 151. RS-232 communication ports 153 and 154 connect to IC transceivers 155 and 156 that respectively connect to CPU 140 via lines 158, 159.

A solenoid connector 160 (FIG. 11) interconnects with hardware to be described later that is used during a vend. On the right side of CPU 140 (i.e., as viewed in FIG. 10) a first pair of lines 162 run to inverters 163 and 164 and from there to solenoid connector 160. A plurality of control lines 168 (FIGS. 10, 11) lead from CPU 140 to a bus transceiver 170 that couple to connector 160 via lines 173. Lines 175 from CPU 140 run to bus transceiver 176, which outputs on lines 178 to a connector 180, that interconnects with various vending machine control and function switches that start motors and perform similar functions. Lines 178 are protected by numerous transient suppression diode pairs 182. A function feedback line 184 from connector 180 reports to CPU 140 via inverter 186 and line 187.

Figure 28:
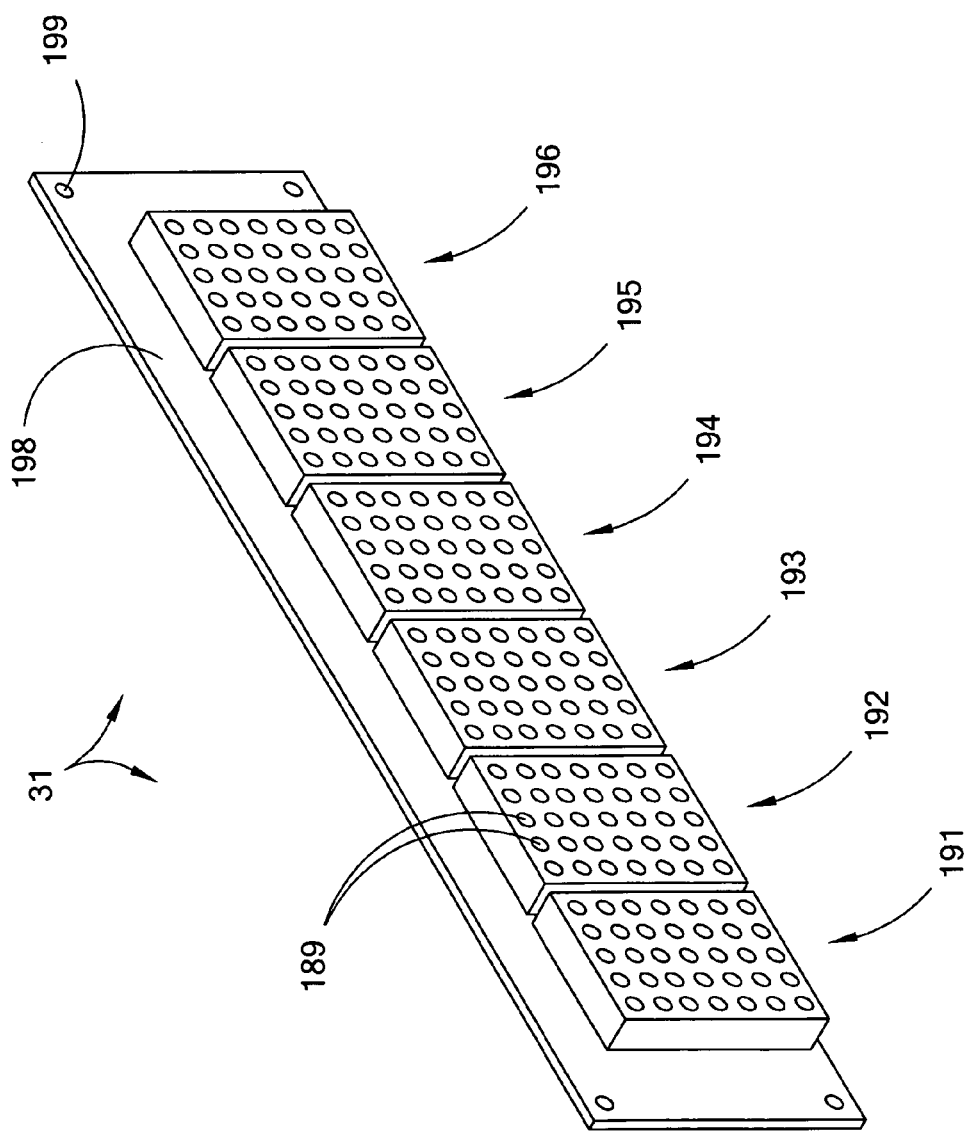
FIG. 28 is a fragmentary isometric view of the scrolling display.

An important function of the CPU 140 (FIG. 10) is to control the scrolling dot matrix display 31 discussed earlier. As viewed in FIG. 28, the preferred scrolling LED dot matrix display 31 has a plurality of separate visual display "dominoes" 191-196 are serially aligned and secured to a conventional circuit board 198. Board 198 includes corner orifices 199 for mechanical mounting such that the dominoes are visible to a customer. Each display domino 191-196 includes a plurality of rows and columns of protected, recessed light sockets 189 in which LED's are disposed. In the best mode there are five rows and seven columns of sockets 189 on each domino. As will be explained in the description of FIG. 28, in the best mode there are six display dominoes aligned and affixed upon a single circuit board 198.

Figure 29:
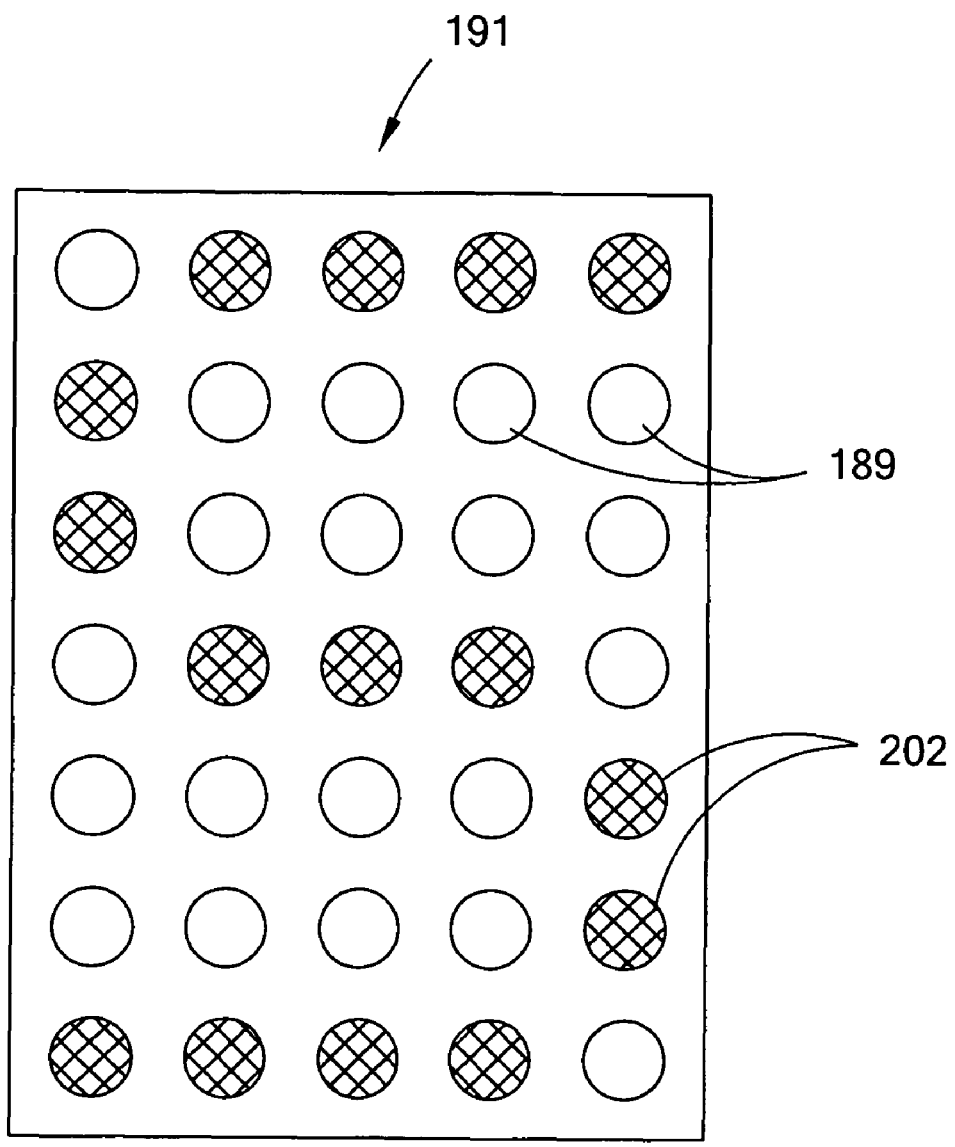
FIG. 29 is an enlarged diagrammatic view of a single domino used in the display of FIG. 28, showing illumination of selected sockets of a single domino; and, FIG. 30 is a fragmentary isometric view of the bar graph.

The face of a single domino 191 is shown in FIG. 29. Again, there are rows and columns of various sockets 189 that can be illuminated by circuitry to be described hereinafter. A suitable combination of individual sockets 202 has been chosen for illumination and switched on by CPU 140 (FIG. 10) such that the letter "S" has been displayed by illuminating the appropriate LEDs to be described hereinafter. A letter, number or any desired ASCII character can be displayed on a given side of the domino array in FIG. 28, for example, and then scrolled to the left or right, being successively displayed on aligned dominoes as the image scrolls.

Figure 13:
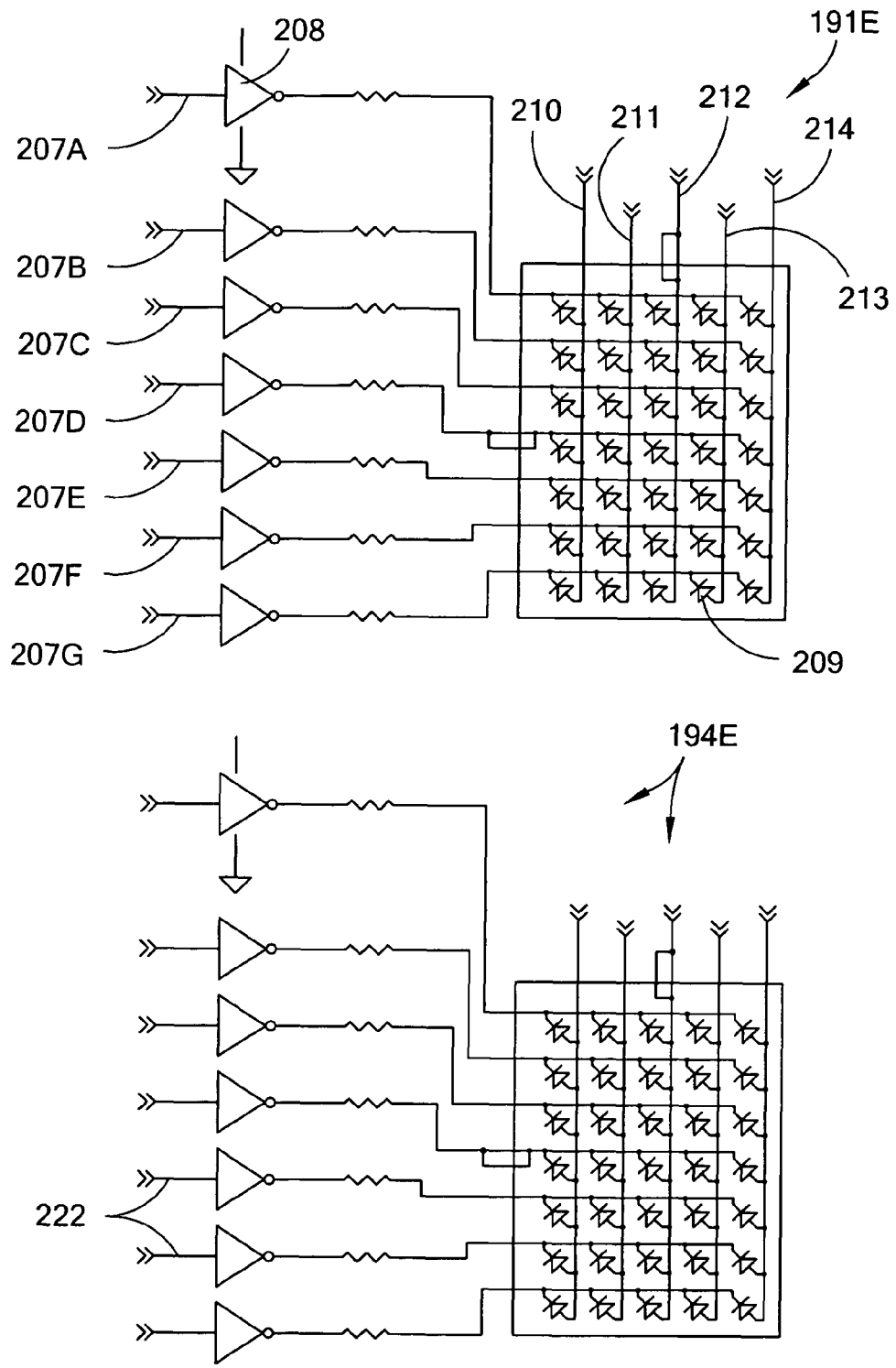
FIGS. 13-15 are electronic schematic diagrams of the preferred scrolling dot matrix display.
Figure 14:
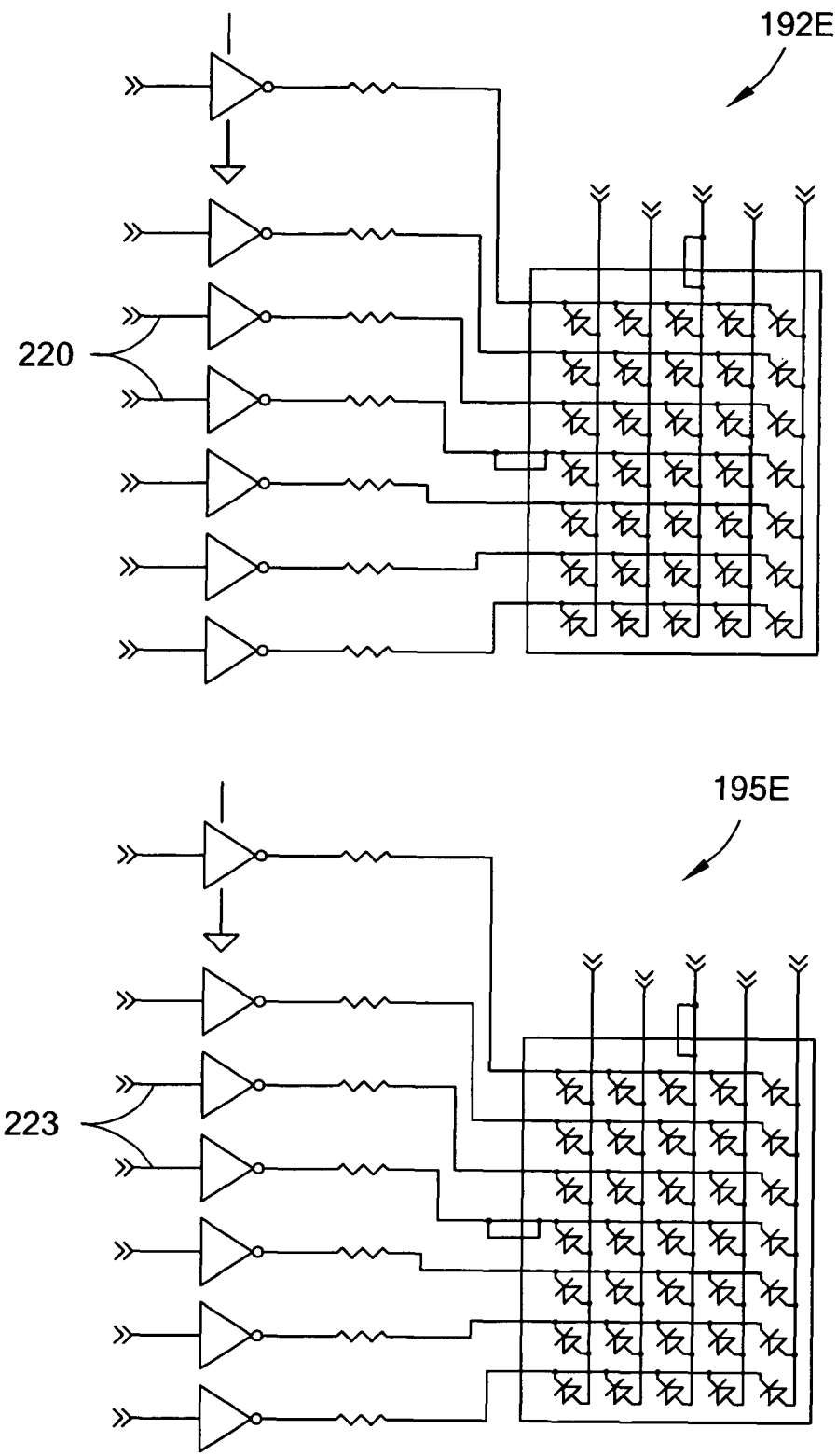
Figure 15:
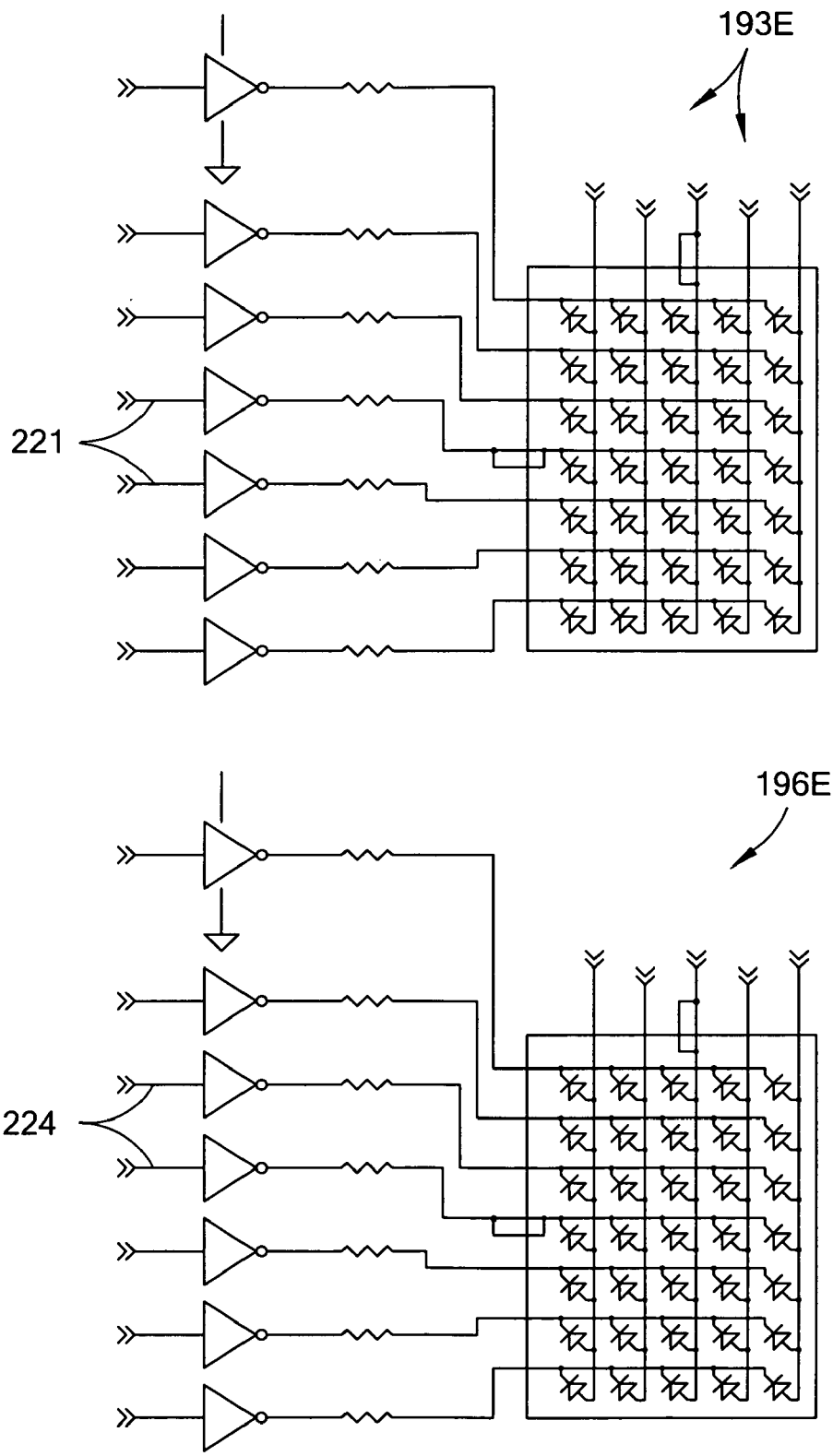

CPU 140 in FIG. 10 controls the dot matrix display 190 (FIG. 28); to do so, it provides a plurality of column and row outputs for each domino. Domino control circuits are seen in FIGS. 13-15, which should be arrayed and positioned as in FIG. 16 for study. Since, as mentioned above, there are five columns and seven rows of illuminated sockets on each of the six dominoes on a given display circuit board 198, there are a corresponding number of five CPU column inputs and seven CPU row inputs associated with each diode matrix array appearing in FIGS. 13-15. For clarity, the electronic circuit representation of each domino 191-196 that is physically illustrated in detail in FIG. 28 has been designated with the corresponding sequential reference numerals 191E-196E in FIGS. 13-15. Since each domino is identical, only one need be described in detail.

With emphasis on FIGS. 10, 11 and 13, the CPU 140 has seven output row control lines 207 that interconnect with seven corresponding "ROW input" driver lines 207A-207G in the domino circuit 191E (FIG. 13). Each domino circuit 191E-196E has its own separate group 207 and 220-224 (FIG. 10) of seven ROW input lines. Each ROW input driver line 207A-207G leads to a driver inverter 208 (FIG. 13) that outputs to a given row of LED's 209. Before a given LED in the matrix will be illuminated, the "column end" of each LED 209 (FIG. 13) must be appropriately gated.

As best seen in FIG. 13, there are five column lines 210-214. The five column lines 210-214 (FIG. 13) are respectively driven by and interconnected with column driver circuits 210D-214D respectively (FIG. 1) that are controlled by input lines 210E-214E, each of which controls a gate 217 leading to a MOSFET controller 219. The column driver input lines 210E-214E (FIG. 11) are respectively interconnected with the five CPU column control lines 210G-214G (FIG. 10). For brevity, the LED display row control lines of domino circuits 191E-196E (FIGS. 13-15) have been respectively designated by the reference numerals 207 and 220-224 in FIG. 10.

The preferred bar graph 30 (i.e., FIG. 1, 30) comprises a plurality of illuminated segments 215A-215 E that are arranged in a contiguous fashion to form a linear display (i.e., a straight line). Computer circuitry to be described hereinafter drives the bar graph, and selects one or more primary colors to provide a colored indication correlated to the item that a customer selects. When fully illuminated, the bar graph indicates that 100 percent of a purchased commodity is available and remains to be vended. When a customer selects a different product or service in the middle of a vend (i.e., before vending of a previously selected product has completed) the bar graph returns to a one hundred percent indication, becoming fully illuminated. As the product or commodity is vended, the percent of illumination of the bar graph drops. Thus an analog indication of the relative amount of a given vend is provided. And from a distance, since there is a color display, an owner/operator who has deployed the vending machine 10 upon his or her facilities can quickly visually determine which products are being vended.

Figure 18:
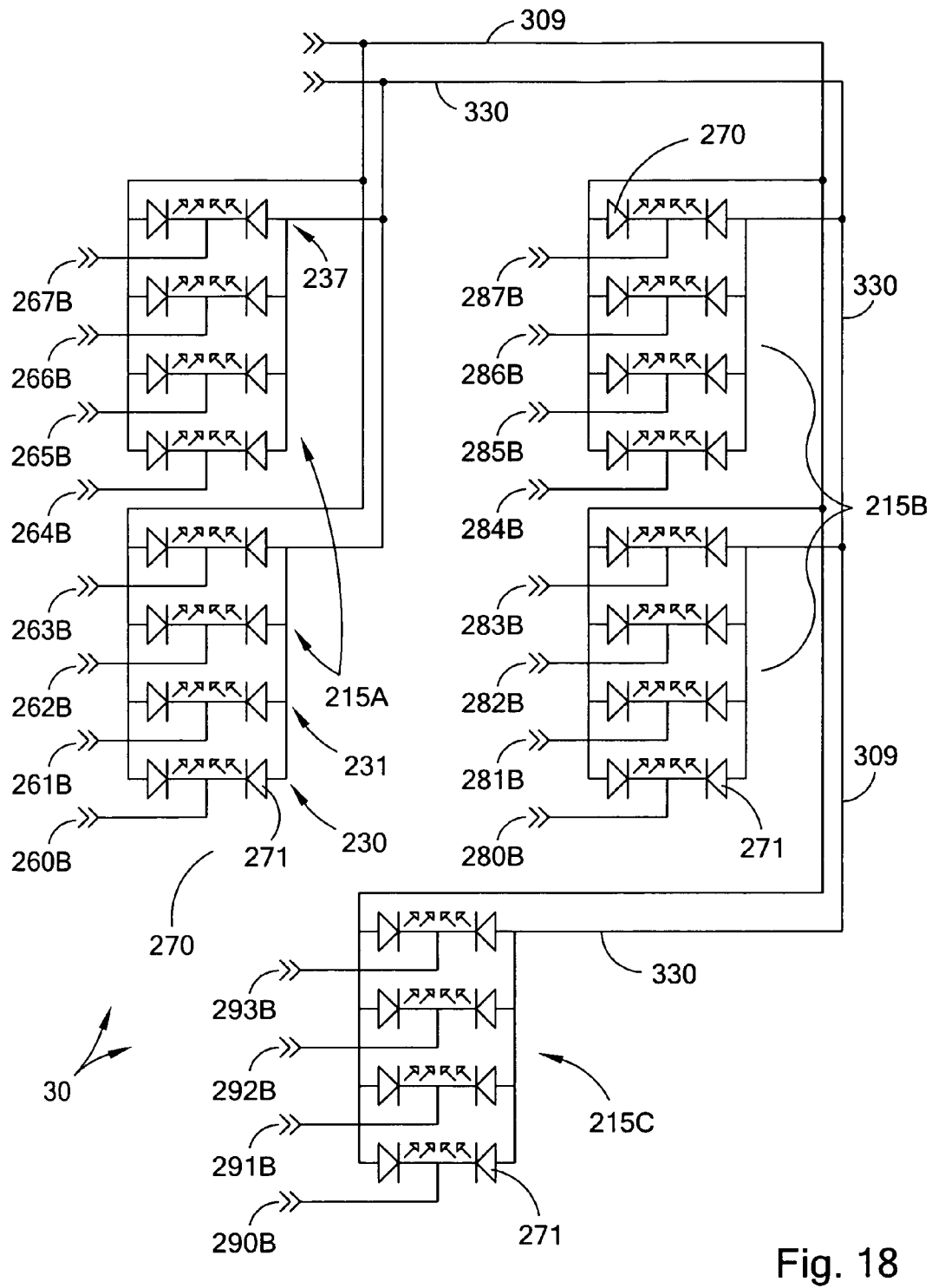
FIGS. 18 and 19 are electronic schematic diagrams of the preferred bar graph display module.
Figure 19:
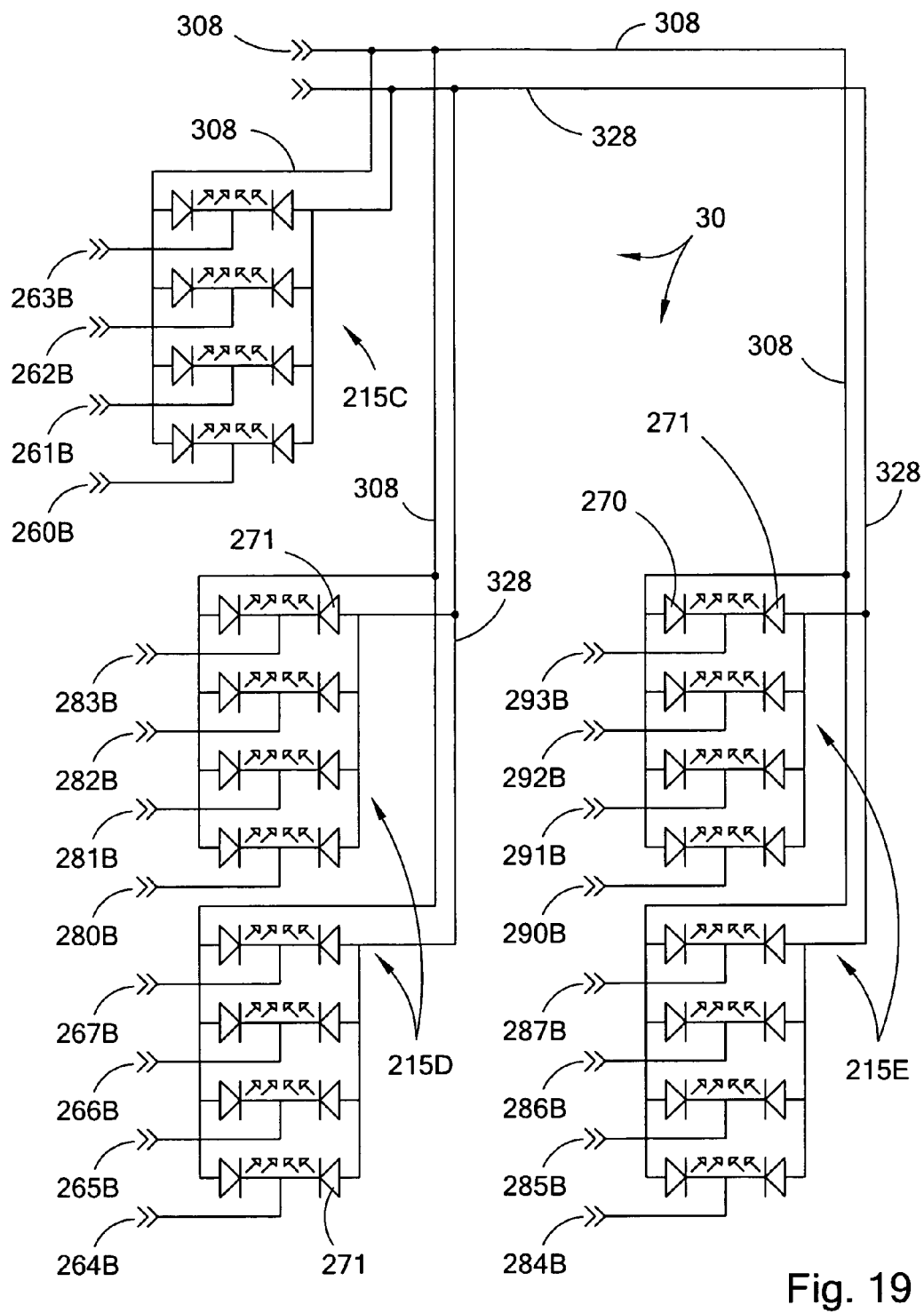
Figure 21:
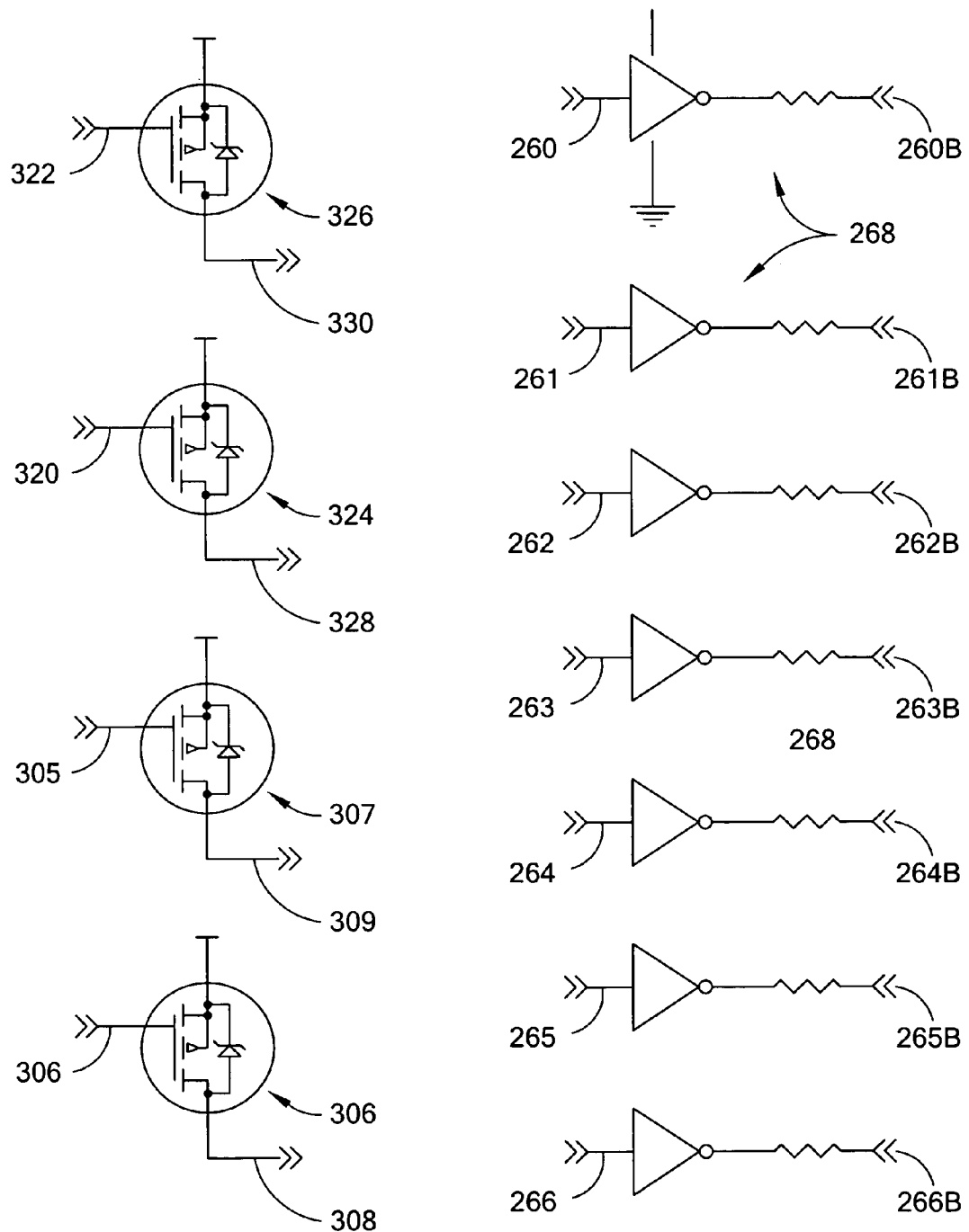
FIGS. 21 and 22 are electronic schematic diagrams of preferred bar graph driver circuits.
Figure 22:
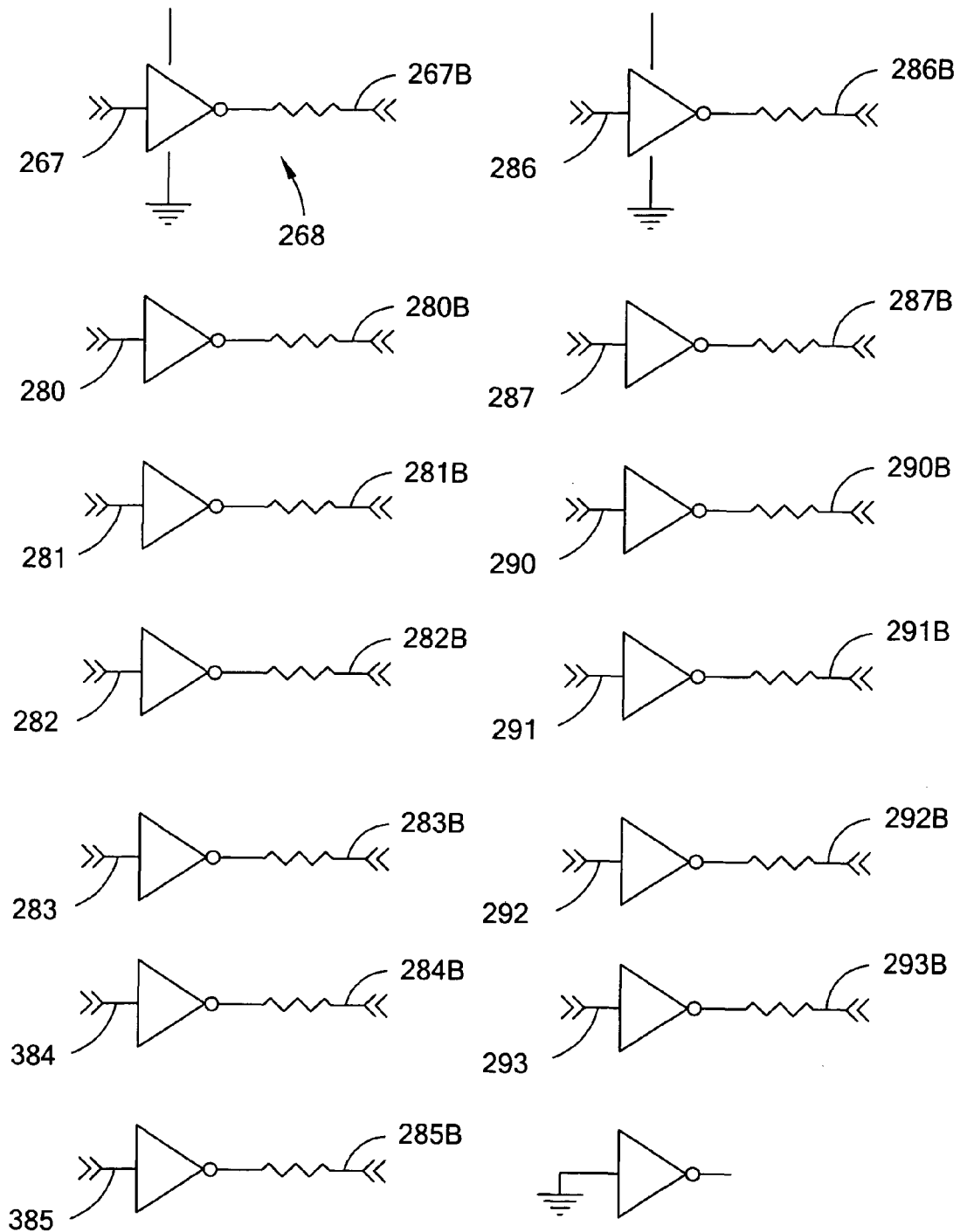
Figure 30:
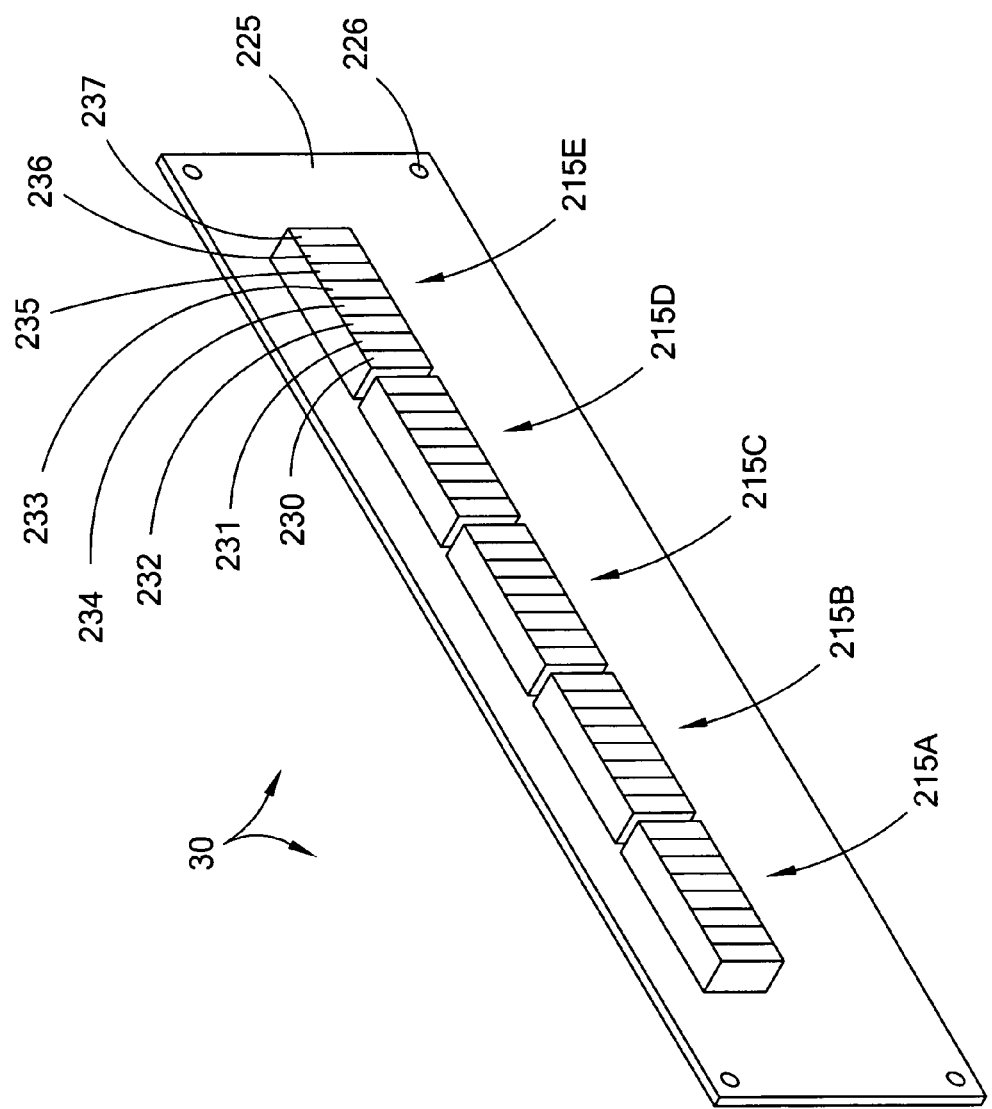

As seen in FIG. 30, the bar graph 30 comprises a plurality of separate display segments 215A-215E that are arranged in a row upon a conventional circuit board 225. Holes 226 in the board corners enable physical mounting, such that the display is visible at the front of the vending machine cabinet. In the best mode there are five separate display segments. Each of the separate display segments 215A-215E are generally rectangular. Each segment comprises a plurality of separate, adjacent cells 230-237 that are separately illuminated. Each cell has at least a pair of LEDs inside, preferably of different primary colors. In the best mode, each cell 230-237 has a red LED 270 and a green LED 271 (FIG. 18, 19), that are controlled by the computer circuitry of FIG. 17 through the driver circuits of FIGS. 21-22. FIGS. 18 and 19 schematically show the preferred LED circuitry and arrangement, including the individual pairs of connected, colored LED's in each of the eight cells comprising each of the five bar graph segments 215A-215E.

Figure 17:
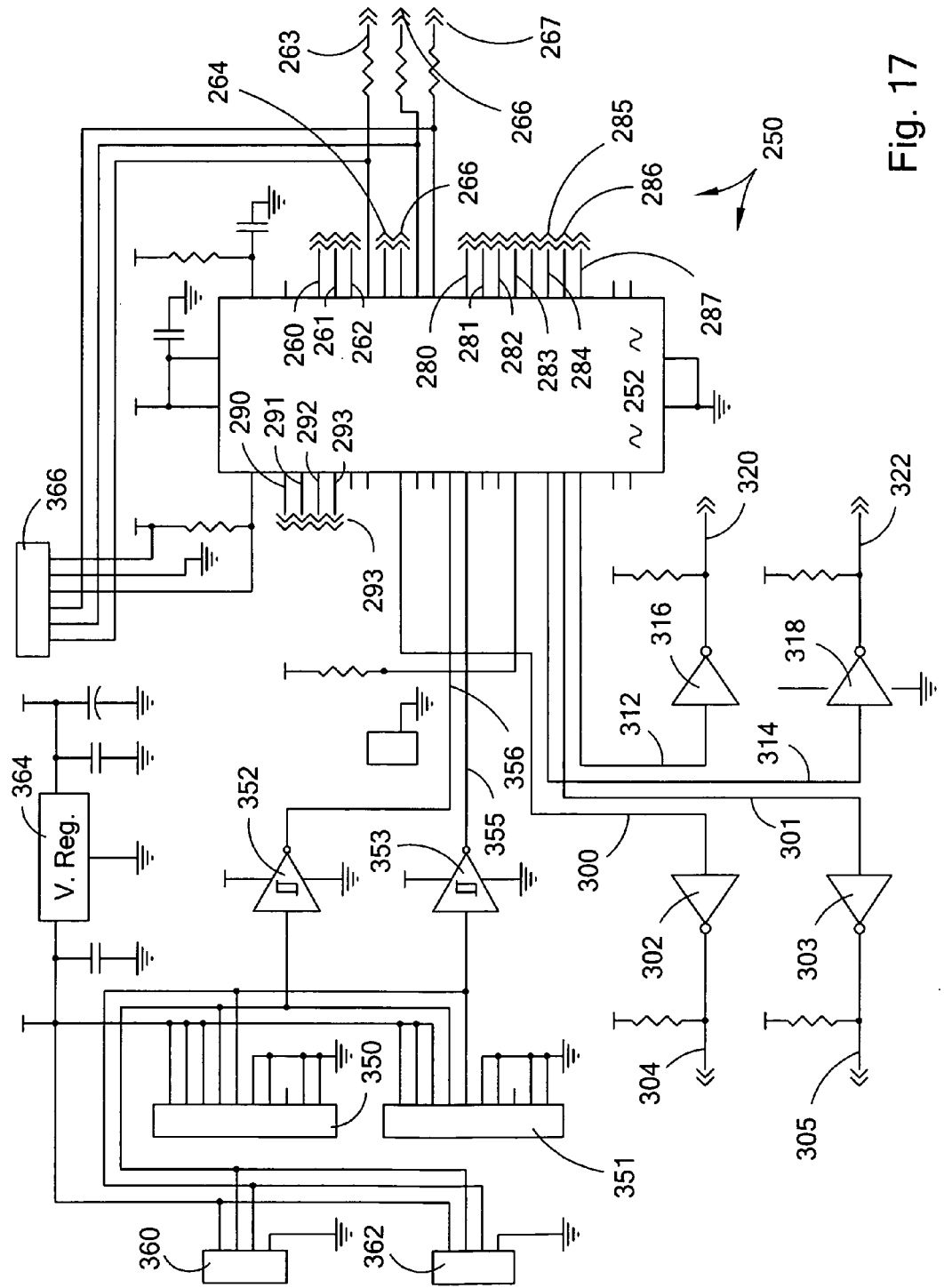
FIG. 17 is an electronic schematic diagram of the preferred flash memory and bar graph controller circuitry.

Referencing FIG. 17, the bar graph controller circuit has been broadly designated by the reference numeral 250. The core CPU 252 comprises a Pic 610F874, and includes SRAM flash memory referenced previously in the discussion of software steps 89, 90, and 92. A first set of eight bar graph cell control lines exiting CPU 252 designated by the reference numeral 260-267 (FIG. 17) lead to driver circuits 268 seen in FIGS. 21 and 22. Driver circuits 268 have outputs 260B-267B respectively that are coupled to the bar graph segment cells 230-237 of the first bar graph segment 215A. Specifically, the bar graph cell control lines ultimately lead to the cathodes of the various red and green LEDs 270, 271 (i.e., FIG. 18) within the bar graph segment cells. The LED anode sides are controlled in a manner discussed hereinafter.

Noting FIG. 18, bar graph segment 215A (physically seen in FIG. 30) is shown schematically. Each of the eight individual cells 230-237 (FIGS. 18, 30) of bar graph segments 215A-215E comprise a separate red LED 270 and a green LED 271. Driver lines 260B-267B are also connected to various cells in segments 215B and 215D as shown. Similarly another group of bar graph cell control lines 280-287 extend from CPU 252 (FIG. 17) to the indicated driver circuits in FIG. 22. The corresponding driver outputs 280B-287B are delivered to individual cells of the display segment 215B (FIG. 18). Driver outputs 280B-283B are also delivered to cells in bar graph segment 215D (FIG. 19). Driver outputs 284B-287B are also delivered to cells in bar graph segment 215E. A final group of four bar graph cell control lines 290-293 (FIG. 17) extend from CPU 252 to the drivers of FIG. 22 whose outputs 290B-293B respectively lead to cells in both bar graph display segment 215C (FIG. 18) and bar graph display segment 215E (FIG. 19).

CPU output lines 300, 301 (FIG. 17) control the anode side of the red LED's 270 (FIGS. 18, 19). Lines 300, 301 respectively lead to buffers 302, 303 that output on lines 304, 305 (FIGS. 17, 21) leading to drivers 306, 307 (FIG. 21) respectively. Each driver 306, 307 comprises a CMOS driver transistor that outputs a color control signal on lines 308 and/or 309 respectively. As seen in FIG. 18, color control line 309 is delivered to the anode side of red LEDs 270 in display segments 215A, 215B, and 215C. Referencing FIG. 19, color control line 308 connects to the anode side of the red LEDs 270 in bar graph display segments 215C, 215D, and 215E. The green LED's receive color control signals derived from CPU lines 312, 314 leading to buffers 316, 318 respectively, whose outputs on lines 320, 322 (FIGS. 17, 21) reach drivers 324 and 326, outputting green color control signals on lines 328, 330 respectively. Referencing FIGS. 18, 19, and 21, color control lines 328 reach the anodes of green LED's 271 in display segments 215A-215E, and color control lines 330 reach the anodes of green LED's 271 in display segments 215A-215C. Thus the individual red and green LED's 270, 271 respectively can be separately controlled. Both can be varied in intensity. The resultant bar graph color can be a combination of two primary colors.

Returning now to FIG. 17, a pair of connectors 350, 351 lead through inverters 352, and 353 to input lines 355, 356 on CPU 252. The interface to the bar graph 30 is via connectors 350, 351 or 360, 364. The host sends a command string to the bar graph 30 containing three binary, eight bit bytes to specify; the number of segments in the bar graph to turn on, the intensity of the first primary color (i.e., the red LED's 270) and the intensity of the second primary color (i.e., the green LEDs 271). Once the segments are commanded to turn on, they remain on until a new command is received.

While a chosen commodity or service is being vended, the number of bar graph segments will be decreased at a rate corresponding to the rate that the balance is being reduced by the vending operation. Individual cells in given segments will first be decremented. If the customer selects a different commodity or service to be vended, then all of the segments (i.e., all of the cells in all of the segments) on the bar graph 30 will be again be fully illuminated. Subsequently, the cells in individual segments will be turned off serially, decreasing at a rate corresponding to the speed at which a selected commodity or service is delivered. In addition, the intensity of the two primary colors (i.e., red and green in the best mode) for each of the illuminated segments of the bar graph will be changed to correspond to the desired mixture of colors that are displayed in conjunction with the commodity or service selected.

With either machine 10 or 22 various selectable commodities or services are available, and it is desired that the bar graph use different display colors that are correlated with product selection. The possible display colors result from the characteristic primary color of the LED's 270,and/or 271 in the bar graph segment cells. When a first vend commodity is selected, i.e., low speed vacuum, the bar graph 30 may be colored red, and only the red LED's within the cells 230 etc. will be turned "on." When a second vend item is selected, i.e., high speed vacuum, the bar graph may use only the green LEDs 271. When a third product is selected, i.e., spot remover, the bar graph segments may be illuminated by a combination of both red and green light, so LEDs 270, 271 (FIG. 18, 19) are all partially illuminated. In this manner the color of the illuminated bar graph segments/cells is an indication of the commodity or service being vended, and the display color acts as a signal to the user regarding which selection has been made.

While the multi vending system is active, the user may elect to deposit additional cash so that the vending operation may be extended. If this is done then, the bar graph will be commanded to illuminate One hundred percent of the bar graph segments using the light color combination for the presently selected vending operation. The number of illuminated segments in the bar graph will be increased to One hundred percent every time additional cash is deposited. As the cash value is consumed by the vending operation, the number of illuminated segments will be decreased at a rate proportional to the rate at which the balance is being consumed by the vending operation.

Figure 24:
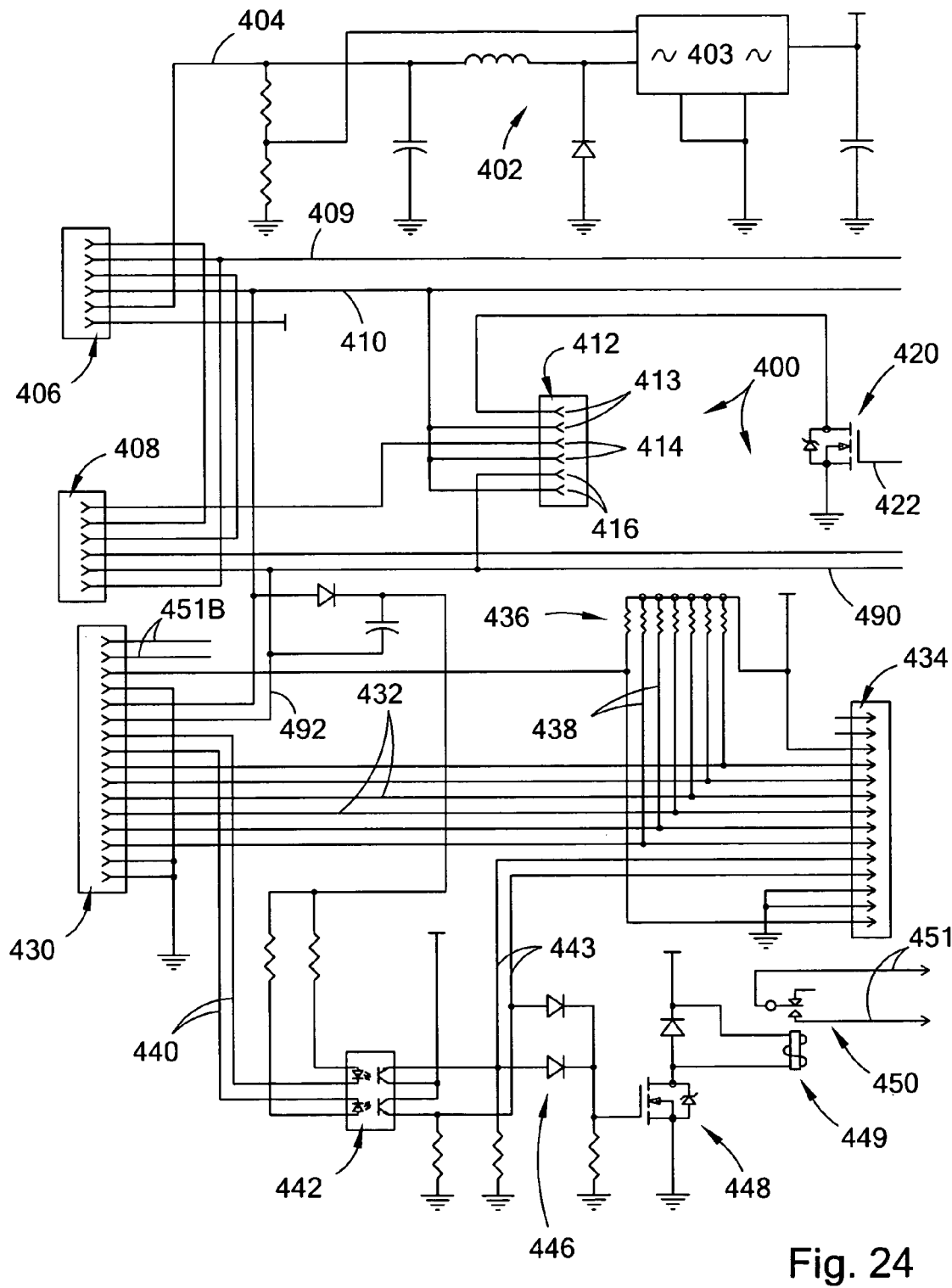
FIGS. 24-25 are electronic schematic diagrams of the preferred vending relay control apparatus.
Figure 25:
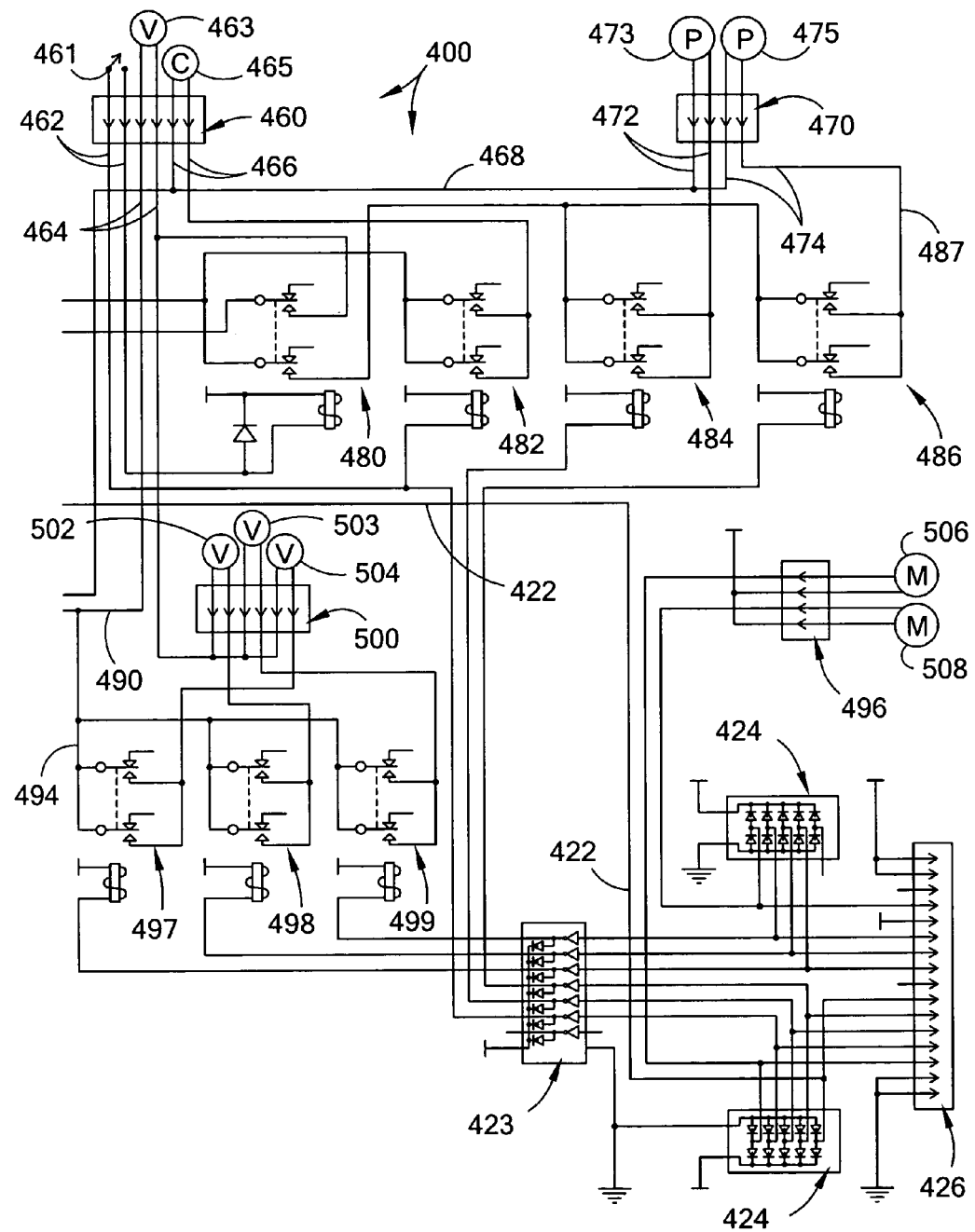
Figure 26:
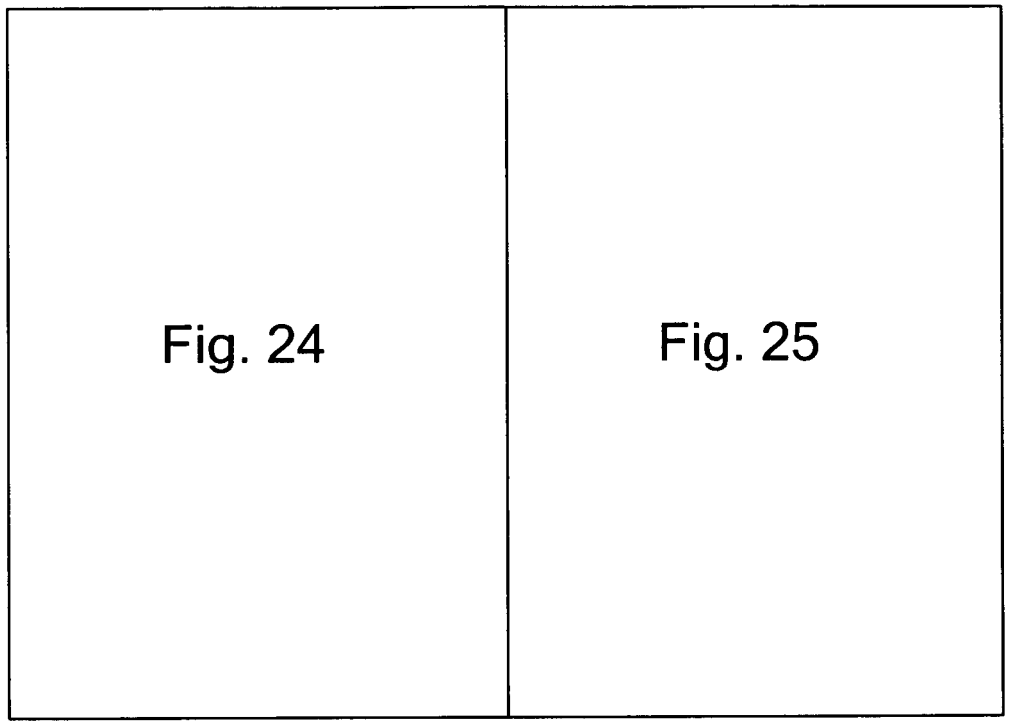
FIG. 26 is a diagrammatic view indicating how FIGS. 24 and 25 should be positioned for viewing.

Hardware construction is illustrated in FIGS. 24 and 25, which should be positioned as seen in FIG. 26 for viewing. The hardware circuit 400 comprises a regulated power supply 402 that outputs twenty four volts DC from regulator 403 on line 404 that is delivered to junction connector 406 that leads to a fuse box (not shown). AC power inputs are provided by connection block 408. High voltage AC (i.e., 115 volts) is available on line 409, and low voltage (i.e., 24 volts DC) is available on line 410 which is connected through a fuse (not shown) to line 404. All relays in the circuitry use 24 volts DC.

Connector 412 (FIG. 24) connects to a wiring harness to activate a horn across lines 413 that provides an audible beeping signal when money is inputted into the vending machine, and when a vend is near completion and additional money may be required to finish the customers job. Lines 413 (FIG. 24) thus control the audio annunciator block 70 discussed previously in conjunction with FIG. 7. An alarm circuit may be powered across lines 414 (FIG. 24). Finally lines 416 run to power supply connector 42 (FIG. 6) to energize circuit 40. The CMOS switch 420 (FIG. 24) activates the horn in response to a signal on line 422 (FIGS. 24, 25) leading through driver inverter 423 to protective diode banks 424 that limit voltages applied to connector 426. The connector 426 interconnects with controller connector 160 (FIG. 11).

Various switches and controls on the front door of the either vending machine 10 or 22 are interconnected through junction coupling 430 that is interconnected with another connector 434 via lines 432. Connector 434 is plugged into controller connector 180 in FIG. 11. A series of pull down resistors insure switching voltage on lines 438 that interconnect with lines 432. Connector 430 (FIG. 24) is coupled to the inside of the cabinet door 20 (FIG. 1) and interconnects with the coin mechanism 66, the dollar bill acceptor 67 and the switches 33 and 34 (FIGS. 1-4).

Lines 440 (FIG. 24) run from the standard coin and dollar bill changers 66, 67 via plug 430 to an optical-isolator 442 that outputs on lines 443 to connector 434. Diodes 446 deliver a trigger signal to a MOSFET switch 448 that outputs to relay field 449 to activate contacts 450, that control lines 451 leading to pin lines 451B on connector 430 (FIG. 24).

Connector 460 (FIG. 25) connects through lines 462 to a customer activated pushbutton handle switch 461 (FIG. 25) physically on either the applicator brush 13 (FIG. 1) or fragrance applicator wand 15 (FIG. 4). A dump valve 463 (FIG. 25) that is physically in series with an air compressor 465, and is connected via lines 464 to redirect high pressure air in response to the switching signal from the switch 461. The air compressor 465 is connected on lines 466. Line 468 leads to connector 470 that has lines 472 for an optional shampoo pump 473, and output lines 474 for the spot remover pump 475. Neither machines 10 (FIG. 1) or 22 (FIG. 4) presently has the option of shampoo. Relay circuit 480, which connects with lines 462 controls the dump valve 463. Relay 482 controls the compressor 465. Relay 484 controls the shampoo pump 473 via lines 472. Relay 486 (FIG. 25) controls the spot remover pump 475 used in machine 10 via line 487 and connector 470.

Machine 22 (FIG. 4) has the option of providing fragrances. Switch 34 selects a desired fragrance via lines 490, 492 (FIG. 24) that are connected to the fragrance select output circuitry via line 494 (FIG. 25). The three fragrance relays 497, 498, and 499 (FIG. 25) lead to connector 500 to control the desired fragrance valves 502, 503, or 504. Connector 496 (FIG. 25) controls the vacuum motors 506, 508 (i.e., there are preferably two such motors) through suitable solid state relays (not shown).

Turning to FIG. 27, the smart card reader 72 is shown schematically. The preferred reader is an Amphenol Model No. 953438-1, made in accordance with U.S. Pat. No. 6,336, 588. The reader is coupled to connector 150 (FIG. 1) with a connector 550 (FIG. 27). Line 551 carries date to microchip 554, which is physically located on the smart card 73, which is interconnected electrically when inserted into the reader 72. Line 552 provides clock signals. Line 553 provides a "card present" signal derived from a normally-closed switch 555 that is opened when a card is inserted into the reader.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A vending machine comprising:
    means for enabling a customer of the machine to select an initial product or service to be vended at a given price;
    means for accepting payment from customers;
    a controller for operating the vending machine, the controller comprising:
        means for recognizing said payment and establishing customer credit in response to the payment;
        means for initiating a vend of the initial selected product or service;
        means for determining the amount of the initial selected product or service that remains as the vend is completed; and,
        bar graph means operated by said controller for providing a visual analog display varying between zero and one hundred percent illumination that corresponds to the amount of a selected product or service that remains to be vended, wherein the bar graph means comprises a plurality of separate segments arranged serially in a line that can be individually illuminated, and wherein all of the illuminated segments in the bar graph means are illuminated any time a vend is initiated, and as the vend completes, the number of illuminated segments decreases to indicate the proportion of the selected product or service that remains to be vended;
    means for recognizing when a subsequent product or service is selected by the customer while credit still remains for the vend of the initial product or service;
    means for initiating a vend of the subsequently selected product or service;
    means for recognizing the customer credit remaining after the vend of the initial product or service;
    means for determining how much of said subsequent product or service may be vended in response to said customer credit remaining; and,
    means for resetting the bar graph means to a one hundred percent indication which is thereafter visibly decreased in response to the vending of said subsequent product or service.

2. The machine as defined in claim 1 wherein each bar graph segment comprises a plurality of cells, each cell housing differently colored light emitting means for generating and displaying different colors in response to the selection of different products or services either as an initial vend is selected or during a vend.

3. The vending machine as defined in claim 2 wherein said products and services are selected from the group consisting of vacuum suction, fragrance, and spot remover.

* * * * *